(12) United States Patent
Palla et al.

(10) Patent No.: US 11,467,605 B2
(45) Date of Patent: Oct. 11, 2022

(54) ZONAL MACHINE CONTROL

(71) Applicant: Deere & Company, Moline, IL (US)

(72) Inventors: Bhanu Kiran Reddy Palla, Bettendorf, IA (US); Nathan R. Vandike, Geneseo, IL (US); Federico Pardina-Malbran, Fort Collins, CO (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 549 days.

(21) Appl. No.: 16/380,550

(22) Filed: Apr. 10, 2019

(65) Prior Publication Data

US 2020/0326727 A1 Oct. 15, 2020

(51) Int. Cl.
| | |
|---|---|
| *G05D 1/00* | (2006.01) |
| *G05D 1/02* | (2020.01) |
| *A01D 41/127* | (2006.01) |
| *A01B 69/00* | (2006.01) |
| *G05B 13/04* | (2006.01) |

(Continued)

(52) U.S. Cl.
CPC ......... *G05D 1/0291* (2013.01); *A01B 69/004* (2013.01); *A01D 41/1278* (2013.01); *G05B 13/04* (2013.01); *A01F 12/184* (2013.01); *G05B 17/02* (2013.01); *G05D 1/0212* (2013.01); *G05D 1/0278* (2013.01); *G05D 2201/0201* (2013.01)

(58) Field of Classification Search
CPC .. G05D 1/0291; G05D 1/0212; G05D 1/0278; G05D 2201/0201; A01D 41/1278; A01B 69/004; G05B 13/04; G05B 17/02; A01F 12/184
See application file for complete search history.

(56) References Cited

U.S. PATENT DOCUMENTS

| | | |
|---|---|---|
| 3,568,157 A | 3/1971 | Downing et al. |
| 3,580,257 A | 5/1971 | Teague |
| 3,599,543 A | 8/1971 | Kerridge |

(Continued)

FOREIGN PATENT DOCUMENTS

| | | |
|---|---|---|
| AR | 108898 A1 | 10/2018 |
| AU | 20100224431 A1 | 4/2011 |

(Continued)

OTHER PUBLICATIONS

S. Veenadhari et al., "Machine Learning Approach for Forecasting Crop Yield Based on Climatic Parameters", 2014 International Conference on Computer Communication and Informatics (ICCCI-2014) Jan. 3-5, 2014, Coimbatore, India, 5 pages.

(Continued)

*Primary Examiner* — Truc M Do
(74) *Attorney, Agent, or Firm* — Joseph R. Kelly; Kelly, Holt & Christenson PLLC

(57) ABSTRACT

A work machine receives a thematic map that maps values of a variable to different geographic locations at a worksite. Control zones are dynamically identified on the thematic map and actuator settings are dynamically identified for each control zone. A position of the work machine is sensed, and actuators on the work machine are controlled based upon the control zones that the work machine is in, or is entering, and based upon the settings corresponding to the control zone. These control zones and settings are dynamically adjusted based on in situ (field) data collected by sensors on the work machine.

20 Claims, 11 Drawing Sheets

(51) Int. Cl.
  *G05B 17/02* (2006.01)
  *A01F 12/18* (2006.01)

(56) References Cited

U.S. PATENT DOCUMENTS

| | | | |
|---|---|---|---|
| 3,775,019 A | 11/1973 | Konig et al. |
| 3,856,754 A | 12/1974 | Habermeier et al. |
| 4,129,573 A | 12/1978 | Bellus et al. |
| 4,166,735 A | 9/1979 | Pilgram et al. |
| 4,183,742 A | 1/1980 | Sasse et al. |
| 4,268,679 A | 5/1981 | Lavanish |
| 4,349,377 A | 9/1982 | Durr et al. |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann et al. |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A | 12/1995 | Clegg et al. |
| 5,488,817 A | 2/1996 | Paquet et al. |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy et al. |
| 5,849,665 A | 12/1998 | Gut et al. |
| 5,878,821 A | 3/1999 | Flenker et al. |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,859 A | 11/1999 | Takahashi |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale |
| 6,119,531 A | 9/2000 | Wendte et al. |
| 6,128,574 A | 10/2000 | Diekhans |
| 6,141,614 A | 10/2000 | Janzen et al. |
| 6,178,253 B1 | 1/2001 | Hendrickson et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | Diekhans |
| 6,216,071 B1 | 4/2001 | Motz |
| 6,236,924 B1 | 5/2001 | Motz et al. |
| 6,272,819 B1 | 8/2001 | Wendte et al. |
| 6,327,569 B1 | 12/2001 | Reep |
| 6,374,173 B1 | 4/2002 | Ehlbeck |
| 6,380,745 B1 | 4/2002 | Anderson et al. |
| 6,431,790 B1 | 8/2002 | Anderegg et al. |
| 6,451,733 B1 | 9/2002 | Pidskalny et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,591,145 B1 | 7/2003 | Hoskinson et al. |
| 6,591,591 B2 | 7/2003 | Coers et al. |
| 6,592,453 B2 | 7/2003 | Coers et al. |
| 6,604,432 B1 | 8/2003 | Hamblen et al. |
| 6,681,551 B1 | 1/2004 | Sheidler et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,834,550 B2 | 12/2004 | Upadhyaya et al. |
| 6,838,564 B2 | 1/2005 | Edmunds et al. |
| 6,846,128 B2 | 1/2005 | Sick |
| 6,932,554 B2 | 8/2005 | Isfort et al. |
| 6,999,877 B1 | 2/2006 | Dyer et al. |
| 7,073,374 B2 | 7/2006 | Berkman |
| 7,167,797 B2 | 1/2007 | Faivre et al. |
| 7,167,800 B2 | 1/2007 | Faivre et al. |
| 7,191,062 B2 | 3/2007 | Chi et al. |
| 7,194,965 B2 | 3/2007 | Hickey et al. |
| 7,211,994 B1 | 5/2007 | Mergen et al. |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendte |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,557,066 B2 | 7/2009 | Hills et al. |
| 7,628,059 B1 | 12/2009 | Scherbring |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford et al. |
| 8,060,283 B2 | 11/2011 | Mott et al. |
| 8,107,681 B2 | 1/2012 | Gaal |
| 8,145,393 B2 | 3/2012 | Foster et al. |
| 8,147,176 B2 | 4/2012 | Coers et al. |
| 8,152,610 B2 | 4/2012 | Harrington |
| 8,190,335 B2 | 5/2012 | Vik et al. |
| 8,195,342 B2 | 6/2012 | Anderson |
| 8,195,358 B2 | 6/2012 | Anderson |
| 8,213,964 B2 | 7/2012 | Fitzner et al. |
| 8,224,500 B2 | 7/2012 | Anderson |
| 8,252,723 B2 | 8/2012 | Jakobi et al. |
| 8,254,351 B2 | 8/2012 | Fitzner et al. |
| 8,321,365 B2 | 11/2012 | Anderson |
| 8,329,717 B2 | 12/2012 | Minn et al. |
| 8,332,105 B2 | 12/2012 | Laux |
| 8,338,332 B1 | 12/2012 | Hacker et al. |
| 8,340,862 B2 | 12/2012 | Baumgarten et al. |
| 8,407,157 B2 | 3/2013 | Anderson |
| 8,428,829 B2 | 4/2013 | Brunnert et al. |
| 8,478,493 B2 | 7/2013 | Anderson |
| 8,488,865 B2 | 7/2013 | Hausmann et al. |

(56) References Cited

U.S. PATENT DOCUMENTS

| | | |
|---|---|---|
| 8,494,727 B2 | 7/2013 | Green et al. |
| 8,527,157 B2 | 9/2013 | Imhof et al. |
| 8,544,397 B2 | 10/2013 | Bassett |
| 8,577,561 B2 | 11/2013 | Green et al. |
| 8,606,454 B2 | 12/2013 | Wang et al. |
| 8,626,406 B2 | 1/2014 | Schleicher et al. |
| 8,635,903 B2 | 1/2014 | Oetken et al. |
| 8,649,940 B2 | 2/2014 | Bonefas |
| 8,656,693 B2 | 2/2014 | Madsen et al. |
| 8,662,972 B2 | 3/2014 | Behnke et al. |
| 8,671,760 B2 | 3/2014 | Wallrath et al. |
| 8,677,724 B2 | 3/2014 | Chaney et al. |
| 8,738,238 B2 | 5/2014 | Rekow |
| 8,738,244 B2 | 5/2014 | Lenz et al. |
| 8,755,976 B2 | 6/2014 | Peters et al. |
| 8,781,692 B2 | 7/2014 | Kormann |
| 8,789,563 B2 | 7/2014 | Wenzel |
| 8,814,640 B2 | 8/2014 | Behnke et al. |
| 8,843,269 B2 | 9/2014 | Anderson et al. |
| 8,868,304 B2 | 10/2014 | Bonefas |
| 8,909,389 B2 | 12/2014 | Meyer |
| D721,740 S | 1/2015 | Schmaltz et al. |
| 8,942,860 B2 | 1/2015 | Morselli |
| 8,962,523 B2 | 2/2015 | Rosinger et al. |
| 9,002,591 B2 | 4/2015 | Wang et al. |
| 9,008,918 B2 | 4/2015 | Missotten et al. |
| 9,009,087 B1 | 4/2015 | Mewes et al. |
| 9,011,222 B2 | 4/2015 | Johnson et al. |
| 9,014,901 B2 | 4/2015 | Wang et al. |
| 9,043,096 B2 | 5/2015 | Zielke et al. |
| 9,043,129 B2 | 5/2015 | Bonefas et al. |
| 9,066,465 B2 | 6/2015 | Hendrickson et al. |
| 9,072,227 B2 | 7/2015 | Wenzel |
| 9,095,090 B2 | 8/2015 | Casper et al. |
| 9,119,342 B2 | 9/2015 | Bonefas |
| 9,127,428 B2 | 9/2015 | Meier |
| 9,131,644 B2 | 9/2015 | Osborne |
| 9,152,938 B2 | 10/2015 | Lang et al. |
| 9,173,339 B2 | 11/2015 | Sauder et al. |
| 9,179,599 B2 | 11/2015 | Bischoff |
| 9,188,518 B2 | 11/2015 | Snyder et al. |
| 9,188,986 B2 | 11/2015 | Baumann |
| 9,226,449 B2 | 1/2016 | Bischoff |
| 9,234,317 B2 | 1/2016 | Chi |
| 9,235,214 B2 | 1/2016 | Anderson |
| 9,301,447 B2 | 4/2016 | Kormann |
| 9,301,466 B2 | 4/2016 | Kelly |
| 9,313,951 B2 | 4/2016 | Herman et al. |
| 9,326,443 B2 | 5/2016 | Zametzer et al. |
| 9,326,444 B2 | 5/2016 | Bonefas |
| 9,392,746 B2 | 7/2016 | Darr et al. |
| 9,405,039 B2 | 8/2016 | Anderson |
| 9,410,840 B2 | 8/2016 | Acheson et al. |
| 9,439,342 B2 | 9/2016 | Pasquier |
| 9,457,971 B2 | 10/2016 | Bonefas et al. |
| 9,463,939 B2 | 10/2016 | Bonefas et al. |
| 9,485,905 B2 | 11/2016 | Jung et al. |
| 9,489,576 B2 | 11/2016 | Johnson et al. |
| 9,497,898 B2 | 11/2016 | Hennes |
| 9,510,508 B2 | 12/2016 | Jung |
| 9,511,633 B2 | 12/2016 | Anderson et al. |
| 9,511,958 B2 | 12/2016 | Bonefas |
| 9,516,812 B2 | 12/2016 | Baumgarten et al. |
| 9,521,805 B2 | 12/2016 | Muench et al. |
| 9,522,791 B2 | 12/2016 | Bonefas et al. |
| 9,522,792 B2 | 12/2016 | Bonefas et al. |
| 9,523,180 B2 | 12/2016 | Deines |
| 9,529,364 B2 | 12/2016 | Foster et al. |
| 9,532,504 B2 | 1/2017 | Herman et al. |
| 9,538,714 B2 | 1/2017 | Anderson |
| 9,563,492 B2 | 2/2017 | Bell et al. |
| 9,563,848 B1 | 2/2017 | Hunt |
| 9,563,852 B1 | 2/2017 | Wiles et al. |
| 9,578,808 B2 | 2/2017 | Dybro et al. |
| 9,629,308 B2 | 4/2017 | Schøler et al. |
| 9,631,964 B2 | 4/2017 | Gelinske et al. |
| 9,642,305 B2 | 5/2017 | Nykamp et al. |
| 9,648,807 B2 | 5/2017 | Escher et al. |
| 9,675,008 B1 | 6/2017 | Rusciolelli et al. |
| 9,681,605 B2 | 6/2017 | Noonan et al. |
| 9,694,712 B2 | 7/2017 | Healy |
| 9,696,162 B2 | 7/2017 | Anderson |
| 9,699,967 B2 | 7/2017 | Palla et al. |
| 9,714,856 B2 | 7/2017 | Myers |
| 9,717,178 B1 | 8/2017 | Sauder et al. |
| 9,721,181 B2 | 8/2017 | Guan et al. |
| 9,723,790 B2 | 8/2017 | Berry et al. |
| 9,740,208 B2 | 8/2017 | Sugumaran et al. |
| 9,767,521 B2 | 9/2017 | Stuber et al. |
| 9,807,934 B2 | 11/2017 | Rusciolelli et al. |
| 9,807,940 B2 | 11/2017 | Roell et al. |
| 9,810,679 B2 | 11/2017 | Kimmel |
| 9,829,364 B2 | 11/2017 | Wilson et al. |
| 9,848,528 B2 | 12/2017 | Werner et al. |
| 9,856,609 B2 | 1/2018 | Dehmel |
| 9,856,612 B2 | 1/2018 | Oetken |
| 9,861,040 B2 | 1/2018 | Bonefas |
| 9,872,433 B2 | 1/2018 | Acheson et al. |
| 9,903,077 B2 | 2/2018 | Rio |
| 9,903,979 B2 | 2/2018 | Dybro et al. |
| 9,904,963 B2 | 2/2018 | Rupp et al. |
| 9,915,952 B2 | 3/2018 | Dollinger et al. |
| 9,922,405 B2 | 3/2018 | Sauder et al. |
| 9,924,636 B2 | 3/2018 | Lisouski et al. |
| 9,928,584 B2 | 3/2018 | Jens et al. |
| 9,933,787 B2 | 4/2018 | Story |
| 9,974,226 B2 | 5/2018 | Rupp et al. |
| 9,982,397 B2 | 5/2018 | Korb et al. |
| 9,984,455 B1 | 5/2018 | Fox et al. |
| 9,992,931 B2 | 6/2018 | Bonefas et al. |
| 9,992,932 B2 | 6/2018 | Bonefas et al. |
| 10,004,176 B2 | 6/2018 | Mayerle |
| 10,015,928 B2 | 7/2018 | Nykamp et al. |
| 10,019,018 B2 | 7/2018 | Hulin |
| 10,019,790 B2 | 7/2018 | Bonefas et al. |
| 10,025,983 B2 | 7/2018 | Guan et al. |
| 10,028,435 B2 | 7/2018 | Anderson et al. |
| 10,028,451 B2 | 7/2018 | Rowan et al. |
| 10,034,427 B2 | 7/2018 | Krause et al. |
| 10,039,231 B2 | 8/2018 | Anderson et al. |
| 10,064,331 B2 | 9/2018 | Bradley |
| 10,064,335 B2 | 9/2018 | Byttebier et al. |
| 10,078,890 B1 | 9/2018 | Tagestad et al. |
| 10,085,372 B2 | 10/2018 | Noyer et al. |
| 10,091,925 B2 | 10/2018 | Aharoni et al. |
| 10,126,153 B2 | 11/2018 | Bischoff et al. |
| 10,129,528 B2 | 11/2018 | Bonefas et al. |
| 10,143,132 B2 | 12/2018 | Inoue et al. |
| 10,152,035 B2 | 12/2018 | Reid et al. |
| 10,154,624 B2 | 12/2018 | Guan et al. |
| 10,165,725 B2 | 1/2019 | Sugumaran et al. |
| 10,178,823 B2 | 1/2019 | Kovach et al. |
| 10,183,667 B2 | 1/2019 | Anderson et al. |
| 10,188,037 B2 | 1/2019 | Bruns et al. |
| 10,201,121 B1 | 2/2019 | Wilson |
| 10,209,179 B2 | 2/2019 | Hollstein |
| 10,231,371 B2 | 3/2019 | Dillon |
| 10,254,147 B2 | 4/2019 | Vermue et al. |
| 10,254,765 B2 | 4/2019 | Rekow |
| 10,255,670 B1 | 4/2019 | Wu et al. |
| 10,275,550 B2 | 4/2019 | Lee |
| 10,295,703 B2 | 5/2019 | Dybro et al. |
| 10,310,455 B2 | 6/2019 | Blank et al. |
| 10,314,232 B2 | 6/2019 | Isaac et al. |
| 10,315,655 B2 | 6/2019 | Blank et al. |
| 10,317,272 B2 | 6/2019 | Bhavsar et al. |
| 10,351,364 B2 | 7/2019 | Green et al. |
| 10,368,488 B2 | 8/2019 | Becker et al. |
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,477,756 B1 | 11/2019 | Richt et al. |

(56) References Cited

U.S. PATENT DOCUMENTS

| | | |
|---|---|---|
| 10,485,178 B2 | 11/2019 | Mayerle |
| 10,521,526 B2 | 12/2019 | Haaland et al. |
| 10,537,061 B2 | 1/2020 | Farley et al. |
| 10,568,316 B2 | 2/2020 | Gall et al. |
| 10,631,462 B2 | 4/2020 | Bonefas |
| 10,677,637 B1 | 6/2020 | Von Muenster |
| 10,681,872 B2 | 6/2020 | Viaene et al. |
| 10,703,277 B1 | 7/2020 | Schroeder |
| 10,729,067 B2 | 8/2020 | Hammer et al. |
| 10,740,703 B2 | 8/2020 | Story |
| 10,745,868 B2 | 8/2020 | Laugwitz et al. |
| 10,760,946 B2 | 9/2020 | Meier et al. |
| 10,809,118 B1 | 10/2020 | Von Muenster |
| 10,830,634 B2 | 11/2020 | Blank et al. |
| 10,866,109 B2 | 12/2020 | Madsen et al. |
| 10,890,922 B2 | 1/2021 | Ramm et al. |
| 10,909,368 B2 | 2/2021 | Guo et al. |
| 10,912,249 B1 | 2/2021 | Wilson |
| 2002/0011061 A1 | 1/2002 | Lucand et al. |
| 2002/0083695 A1 | 7/2002 | Behnke et al. |
| 2002/0091458 A1 | 7/2002 | Moore |
| 2002/0099471 A1 | 7/2002 | Benneweis |
| 2002/0133309 A1 | 9/2002 | Hardt |
| 2002/0173893 A1 | 11/2002 | Blackmore et al. |
| 2002/0193928 A1 | 12/2002 | Beck |
| 2002/0193929 A1 | 12/2002 | Beck |
| 2002/0198654 A1 | 12/2002 | Lange et al. |
| 2003/0004630 A1 | 1/2003 | Beck |
| 2003/0014171 A1 | 1/2003 | Ma et al. |
| 2003/0015351 A1 | 1/2003 | Goldman et al. |
| 2003/0024450 A1 | 2/2003 | Juptner |
| 2003/0060245 A1 | 3/2003 | Coers et al. |
| 2003/0069680 A1 | 4/2003 | Cohen et al. |
| 2003/0075145 A1 | 4/2003 | Sheidler et al. |
| 2003/0174207 A1 | 9/2003 | Alexia et al. |
| 2003/0182144 A1 | 9/2003 | Pickett et al. |
| 2003/0187560 A1 | 10/2003 | Keller et al. |
| 2003/0216158 A1 | 11/2003 | Bischoff |
| 2003/0229432 A1 | 12/2003 | Ho et al. |
| 2003/0229433 A1 | 12/2003 | van den Berg et al. |
| 2003/0229435 A1 | 12/2003 | Van der Lely |
| 2004/0004544 A1 | 1/2004 | William Knutson |
| 2004/0054457 A1 | 3/2004 | Kormann |
| 2004/0073468 A1 | 4/2004 | Vyas et al. |
| 2004/0193348 A1 | 9/2004 | Gray et al. |
| 2005/0059445 A1 | 3/2005 | Niermann et al. |
| 2005/0066738 A1 | 3/2005 | Moore |
| 2005/0149235 A1 | 7/2005 | Seal et al. |
| 2005/0150202 A1 | 7/2005 | Quick |
| 2005/0197175 A1 | 9/2005 | Anderson |
| 2005/0241285 A1 | 11/2005 | Maertens et al. |
| 2005/0283314 A1 | 12/2005 | Hall |
| 2005/0284119 A1 | 12/2005 | Brunnert |
| 2006/0014489 A1 | 1/2006 | Fitzner et al. |
| 2006/0014643 A1 | 1/2006 | Hacker et al. |
| 2006/0047377 A1 | 3/2006 | Ferguson et al. |
| 2006/0058896 A1 | 3/2006 | Pokorny et al. |
| 2006/0074560 A1 | 4/2006 | Dyer et al. |
| 2006/0155449 A1 | 7/2006 | Dammann |
| 2006/0162631 A1 | 7/2006 | Hickey et al. |
| 2006/0196158 A1 | 9/2006 | Faivre et al. |
| 2006/0200334 A1 | 9/2006 | Faivre et al. |
| 2007/0005209 A1 | 1/2007 | Fitzner et al. |
| 2007/0021948 A1 | 1/2007 | Anderson |
| 2007/0056258 A1 | 3/2007 | Behnke |
| 2007/0068238 A1 | 3/2007 | Wendte |
| 2007/0073700 A1 | 3/2007 | Wippersteg et al. |
| 2007/0089390 A1 | 4/2007 | Hendrickson et al. |
| 2007/0135190 A1 | 6/2007 | Diekhans et al. |
| 2007/0185749 A1 | 8/2007 | Anderson et al. |
| 2007/0199903 A1 | 8/2007 | Denny |
| 2007/0208510 A1 | 9/2007 | Anderson et al. |
| 2007/0233348 A1 | 10/2007 | Diekhans et al. |
| 2007/0233374 A1 | 10/2007 | Diekhans et al. |
| 2007/0239337 A1 | 10/2007 | Anderson |
| 2007/0282523 A1 | 12/2007 | Diekhans et al. |
| 2007/0298744 A1 | 12/2007 | Fitzner et al. |
| 2008/0030320 A1 | 2/2008 | Wilcox et al. |
| 2008/0098035 A1 | 4/2008 | Wippersteg et al. |
| 2008/0140431 A1 | 6/2008 | Anderson et al. |
| 2008/0177449 A1 | 7/2008 | Pickett et al. |
| 2008/0248843 A1 | 10/2008 | Birrell et al. |
| 2008/0268927 A1 | 10/2008 | Farley et al. |
| 2008/0269052 A1 | 10/2008 | Rosinger et al. |
| 2008/0289308 A1 | 11/2008 | Brubaker |
| 2008/0312085 A1 | 12/2008 | Kordes et al. |
| 2009/0044505 A1 | 2/2009 | Huster et al. |
| 2009/0074243 A1 | 3/2009 | Missotten et al. |
| 2009/0143941 A1 | 6/2009 | Tarasinski et al. |
| 2009/0192654 A1 | 7/2009 | Wendte et al. |
| 2009/0216410 A1 | 8/2009 | Allen et al. |
| 2009/0226036 A1 | 9/2009 | Gaal |
| 2009/0259483 A1 | 10/2009 | Hendrickson et al. |
| 2009/0265098 A1 | 10/2009 | Dix |
| 2009/0306835 A1 | 12/2009 | Ellermann et al. |
| 2009/0311084 A1 | 12/2009 | Coers et al. |
| 2009/0312919 A1 | 12/2009 | Foster et al. |
| 2009/0312920 A1 | 12/2009 | Boenig et al. |
| 2009/0325658 A1 | 12/2009 | Phelan et al. |
| 2010/0036696 A1 | 2/2010 | Lang et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063664 A1 | 3/2010 | Anderson |
| 2010/0063954 A1* | 3/2010 | Anderson ............ G05D 1/0221 706/50 |
| 2010/0070145 A1 | 3/2010 | Foster et al. |
| 2010/0071329 A1 | 3/2010 | Hindryckx et al. |
| 2010/0094481 A1 | 4/2010 | Anderson |
| 2010/0121541 A1 | 5/2010 | Behnke et al. |
| 2010/0137373 A1 | 6/2010 | Hungenberg et al. |
| 2010/0145572 A1 | 6/2010 | Steckel et al. |
| 2010/0152270 A1 | 6/2010 | Suty-Heinze et al. |
| 2010/0152943 A1 | 6/2010 | Matthews |
| 2010/0217474 A1 | 8/2010 | Baumgarten et al. |
| 2010/0268562 A1 | 10/2010 | Anderson |
| 2010/0268679 A1 | 10/2010 | Anderson |
| 2010/0285964 A1 | 11/2010 | Waldraff et al. |
| 2010/0317517 A1 | 12/2010 | Rosinger et al. |
| 2010/0319941 A1 | 12/2010 | Peterson |
| 2010/0332051 A1 | 12/2010 | Kormann |
| 2011/0056178 A1 | 3/2011 | Sauerwein et al. |
| 2011/0059782 A1 | 3/2011 | Harrington |
| 2011/0072773 A1 | 3/2011 | Schroeder et al. |
| 2011/0084851 A1 | 4/2011 | Peterson et al. |
| 2011/0086684 A1 | 4/2011 | Luellen et al. |
| 2011/0160961 A1 | 6/2011 | Wollenhaupt et al. |
| 2011/0213531 A1 | 9/2011 | Farley et al. |
| 2011/0224873 A1 | 9/2011 | Reeve et al. |
| 2011/0227745 A1 | 9/2011 | Kikuchi et al. |
| 2011/0257850 A1 | 10/2011 | Reeve et al. |
| 2011/0270494 A1 | 11/2011 | Imhof et al. |
| 2011/0270495 A1 | 11/2011 | Knapp |
| 2011/0295460 A1 | 12/2011 | Hunt et al. |
| 2011/0307149 A1 | 12/2011 | Pighi et al. |
| 2012/0004813 A1 | 1/2012 | Baumgarten et al. |
| 2012/0029732 A1 | 2/2012 | Meyer et al. |
| 2012/0087771 A1 | 4/2012 | Wenzel |
| 2012/0096827 A1 | 4/2012 | Chaney et al. |
| 2012/0143642 A1 | 6/2012 | O'Neil |
| 2012/0215378 A1 | 8/2012 | Sprock et al. |
| 2012/0215379 A1 | 8/2012 | Sprock et al. |
| 2012/0253611 A1 | 10/2012 | Zielke et al. |
| 2012/0263560 A1 | 10/2012 | Diekhans et al. |
| 2012/0265412 A1 | 10/2012 | Diekhans et al. |
| 2012/0271489 A1 | 10/2012 | Roberts et al. |
| 2012/0323452 A1 | 12/2012 | Green et al. |
| 2013/0019580 A1 | 1/2013 | Anderson et al. |
| 2013/0022430 A1 | 1/2013 | Anderson et al. |
| 2013/0046419 A1 | 2/2013 | Anderson et al. |
| 2013/0046439 A1 | 2/2013 | Anderson et al. |
| 2013/0046525 A1 | 2/2013 | Ali et al. |
| 2013/0103269 A1 | 4/2013 | Meyer Zu Hellgen et al. |

(56) References Cited

U.S. PATENT DOCUMENTS

| | | |
|---|---|---|
| 2013/0124239 A1 | 5/2013 | Rosa et al. |
| 2013/0184944 A1 | 7/2013 | Missotten et al. |
| 2013/0197767 A1 | 8/2013 | Lenz |
| 2013/0205733 A1 | 8/2013 | Peters et al. |
| 2013/0210505 A1 | 8/2013 | Bischoff |
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0332003 A1 | 12/2013 | Murray et al. |
| 2014/0002489 A1 | 1/2014 | Sauder et al. |
| 2014/0019017 A1 | 1/2014 | Wilken et al. |
| 2014/0021598 A1 | 1/2014 | Sutardja |
| 2014/0050364 A1 | 2/2014 | Brueckner et al. |
| 2014/0067745 A1 | 3/2014 | Avey |
| 2014/0121882 A1 | 5/2014 | Gilmore et al. |
| 2014/0129048 A1 | 5/2014 | Baumgarten et al. |
| 2014/0172222 A1 | 6/2014 | Nickel |
| 2014/0172225 A1 | 6/2014 | Matthews et al. |
| 2014/0208870 A1 | 7/2014 | Quaderer et al. |
| 2014/0172224 A1 | 8/2014 | Matthews et al. |
| 2014/0215984 A1 | 8/2014 | Bischoff |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson et al. |
| 2014/0277960 A1 | 9/2014 | Blank et al. |
| 2014/0297242 A1 | 10/2014 | Sauder et al. |
| 2014/0303814 A1 | 10/2014 | Burema et al. |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2015/0049088 A1 | 2/2015 | Snyder et al. |
| 2015/0088785 A1 | 3/2015 | Chi |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers |
| 2015/0211199 A1 | 7/2015 | Corcoran et al. |
| 2015/0230403 A1 | 8/2015 | Jung et al. |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson et al. |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0379785 A1 | 12/2015 | Brown, Jr. et al. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0066505 A1 | 3/2016 | Bakke et al. |
| 2016/0071410 A1* | 3/2016 | Rupp .................. G06Q 10/063 701/50 |
| 2016/0073573 A1 | 3/2016 | Ethington et al. |
| 2016/0078375 A1 | 3/2016 | Ethington et al. |
| 2016/0078570 A1 | 3/2016 | Ethington et al. |
| 2016/0088794 A1 | 3/2016 | Baumgarten et al. |
| 2016/0106038 A1 | 4/2016 | Boyd et al. |
| 2016/0084813 A1 | 5/2016 | Anderson et al. |
| 2016/0146611 A1 | 5/2016 | Matthews |
| 2016/0202227 A1 | 7/2016 | Mathur et al. |
| 2016/0203657 A1 | 7/2016 | Bell et al. |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling |
| 2016/0260021 A1 | 9/2016 | Marek |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1 | 11/2016 | Cotton et al. |
| 2016/0330906 A1 | 11/2016 | Acheson et al. |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0049045 A1 | 2/2017 | Wilken et al. |
| 2017/0055433 A1 | 3/2017 | Jamison |
| 2017/0082442 A1 | 3/2017 | Anderson |
| 2017/0083024 A1 | 3/2017 | Reijersen Van Buuren |
| 2017/0086381 A1 | 3/2017 | Roell et al. |
| 2017/0089741 A1 | 3/2017 | Burns et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0208742 A1 | 7/2017 | Ingibergsson et al. |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Scholer et al. |
| 2017/0245434 A1 | 8/2017 | Jung et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0316692 A1 | 11/2017 | Rusciolelli et al. |
| 2017/0318743 A1 | 11/2017 | Sauder et al. |
| 2017/0322550 A1 | 11/2017 | Yokoyama |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |
| 2018/0022559 A1 | 1/2018 | Knutson |
| 2018/0024549 A1 | 1/2018 | Hurd |
| 2018/0035622 A1 | 2/2018 | Gresch et al. |
| 2018/0054955 A1 | 3/2018 | Oliver |
| 2018/0060975 A1 | 3/2018 | Hassanzadeh |
| 2018/0070534 A1 | 3/2018 | Mayerle |
| 2018/0077865 A1 | 3/2018 | Gallmeier |
| 2018/0084709 A1 | 3/2018 | Wieckhorst et al. |
| 2018/0084722 A1 | 3/2018 | Wieckhorst et al. |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120133 A1 | 5/2018 | Blank et al. |
| 2018/0121821 A1 | 5/2018 | Parsons et al. |
| 2018/0124992 A1 | 5/2018 | Koch et al. |
| 2018/0128933 A1 | 5/2018 | Koch et al. |
| 2018/0129879 A1 | 5/2018 | Achtelik et al. |
| 2018/0132422 A1 | 5/2018 | Hassanzadeh et al. |
| 2018/0136664 A1 | 5/2018 | Tomita et al. |
| 2018/0146612 A1 | 5/2018 | Sauder et al. |

(56) References Cited

U.S. PATENT DOCUMENTS

| | | |
|---|---|---|
| 2018/0146624 A1 | 5/2018 | Chen et al. |
| 2018/0153084 A1 | 6/2018 | Calleija et al. |
| 2018/0177125 A1 | 6/2018 | Takahara et al. |
| 2018/0181893 A1 | 6/2018 | Basso |
| 2018/0196438 A1 | 7/2018 | Newlin et al. |
| 2018/0196441 A1 | 7/2018 | Muench et al. |
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |
| 2018/0325014 A1 | 11/2018 | Debbaut |
| 2018/0332767 A1 | 11/2018 | Muench et al. |
| 2018/0338422 A1 | 11/2018 | Brubaker |
| 2018/0340845 A1 | 11/2018 | Rhodes et al. |
| 2018/0359917 A1 | 12/2018 | Blank et al. |
| 2018/0359919 A1 | 12/2018 | Blank et al. |
| 2018/0364726 A1 | 12/2018 | Foster et al. |
| 2019/0021226 A1 | 1/2019 | Dima et al. |
| 2019/0025175 A1 | 1/2019 | Laugwitz |
| 2019/0041813 A1 | 2/2019 | Horn et al. |
| 2019/0050948 A1 | 2/2019 | Perry et al. |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin et al. |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0156255 A1 | 5/2019 | Carroll |
| 2019/0174667 A1 | 6/2019 | Gresch et al. |
| 2019/0183047 A1 | 6/2019 | Dybro et al. |
| 2019/0200522 A1 | 7/2019 | Hansen et al. |
| 2019/0230855 A1 | 8/2019 | Reed et al. |
| 2019/0239416 A1 | 8/2019 | Green et al. |
| 2019/0261550 A1 | 8/2019 | Damme et al. |
| 2019/0261559 A1 | 8/2019 | Heitmann et al. |
| 2019/0261560 A1 | 8/2019 | Jelenkovic |
| 2019/0313570 A1 | 10/2019 | Owechko |
| 2019/0327889 A1 | 10/2019 | Borgstadt |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2020/0000006 A1 | 1/2020 | Mcdonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1 | 4/2020 | Brammeier et al. |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0141784 A1 | 5/2020 | Lange et al. |
| 2020/0146203 A1 | 5/2020 | Deng |
| 2020/0150631 A1 | 5/2020 | Frieberg et al. |
| 2020/0154639 A1 | 5/2020 | Takahara et al. |
| 2020/0163277 A1 | 5/2020 | Cooksey et al. |
| 2020/0183406 A1 | 6/2020 | Borgstadt |
| 2020/0187409 A1 | 6/2020 | Meyer Zu Helligen |
| 2020/0196526 A1 | 6/2020 | Koch et al. |
| 2020/0202596 A1 | 6/2020 | Kitahara et al. |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0265527 A1 | 8/2020 | Rose et al. |
| 2020/0278680 A1 | 9/2020 | Schaltz et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0323133 A1 | 10/2020 | Anderson |
| 2020/0323134 A1 | 10/2020 | Darr et al. |
| 2020/0326674 A1 | 10/2020 | Palla |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0363256 A1 | 11/2020 | Meier et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0015041 A1 | 1/2021 | Bormann et al. |
| 2021/0129853 A1 | 5/2021 | Appleton et al. |
| 2021/0176918 A1 | 5/2021 | Franzen et al. |
| 2021/0176916 A1 | 6/2021 | Sidon et al. |
| 2021/0289687 A1 | 9/2021 | Heinold et al. |
| 2021/0321567 A1 | 10/2021 | Sidon et al. |

FOREIGN PATENT DOCUMENTS

| | | |
|---|---|---|
| BR | MU6800140 U | 12/1989 |
| BR | PI0502658 A | 2/2007 |
| BR | PI0802384 A2 | 3/2010 |
| BR | PI100258 A2 | 3/2014 |
| BR | PI1100258 A2 | 3/2014 |
| BR | 102014007178 A2 | 8/2016 |
| CA | 1165300 A | 4/1984 |
| CA | 2283767 A1 | 3/2001 |
| CA | 2330979 A1 | 8/2001 |
| CA | 2629555 A1 | 11/2009 |
| CA | 135611 S | 5/2011 |
| CN | 2451633 Y | 10/2001 |
| CN | 101236188 A | 8/2008 |
| CN | 100416590 C | 9/2008 |
| CN | 101303338 A | 11/2008 |
| CN | 101363833 A | 2/2009 |
| CN | 201218789 Y | 4/2009 |
| CN | 101839906 A | 9/2010 |
| CN | 101929166 A | 12/2010 |
| CN | 102080373 A | 6/2011 |
| CN | 102138383 A | 8/2011 |

(56) References Cited

FOREIGN PATENT DOCUMENTS

| | | | |
|---|---|---|---|
| CN | 102277867 | B | 12/2011 |
| CN | 202110103 | U | 1/2012 |
| CN | 202119772 | U | 1/2012 |
| CN | 202340435 | U | 7/2012 |
| CN | 103088807 | A | 5/2013 |
| CN | 103181263 | A | 7/2013 |
| CN | 203053961 | U | 7/2013 |
| CN | 203055121 | U | 7/2013 |
| CN | 203206739 | U | 9/2013 |
| CN | 102277867 | B | 10/2013 |
| CN | 203275401 | U | 11/2013 |
| CN | 203613525 | U | 5/2014 |
| CN | 203658201 | U | 6/2014 |
| CN | 103954738 | A | 7/2014 |
| CN | 203741803 | U | 7/2014 |
| CN | 204000818 | U | 12/2014 |
| CN | 204435344 | U | 7/2015 |
| CN | 204475304 | U | 7/2015 |
| CN | 105205248 | A | 12/2015 |
| CN | 204989174 | U | 1/2016 |
| CN | 105432228 | A | 3/2016 |
| CN | 105741180 | A | 7/2016 |
| CN | 106053330 | A | 10/2016 |
| CN | 106198877 | A | 12/2016 |
| CN | 106198879 | A | 12/2016 |
| CN | 106226470 | A | 12/2016 |
| CN | 106248873 | A | 12/2016 |
| CN | 106290800 | A | 1/2017 |
| CN | 106327349 | A | 1/2017 |
| CN | 106644663 | A | 5/2017 |
| CN | 206330815 | U | 7/2017 |
| CN | 206515118 | U | 9/2017 |
| CN | 206515119 | U | 9/2017 |
| CN | 206616118 | U | 11/2017 |
| CN | 206696107 | | 12/2017 |
| CN | 206696107 | U | 12/2017 |
| CN | 107576674 | | 1/2018 |
| CN | 107576674 | A | 1/2018 |
| CN | 206906093 | U | 1/2018 |
| CN | 206941558 | | 1/2018 |
| CN | 206941558 | U | 1/2018 |
| CN | 107736088 | A | 2/2018 |
| CN | 107795095 | A | 3/2018 |
| CN | 207079558 | | 3/2018 |
| CN | 107941286 | A | 4/2018 |
| CN | 107957408 | A | 4/2018 |
| CN | 108009542 | A | 5/2018 |
| CN | 108304796 | A | 7/2018 |
| CN | 207567744 | U | 7/2018 |
| CN | 108614089 | A | 10/2018 |
| CN | 208013131 | U | 10/2018 |
| CN | 108881825 | A | 11/2018 |
| CN | 208047351 | U | 11/2018 |
| CN | 109357804 | A | 2/2019 |
| CN | 109485353 | A | 3/2019 |
| CN | 109633127 | A | 4/2019 |
| CN | 109763476 | A | 5/2019 |
| CN | 109961024 | A | 7/2019 |
| CN | 110262287 | A | 9/2019 |
| CN | 110720302 | A | 1/2020 |
| CN | 111201879 | A | 5/2020 |
| CN | 210585958 | U | 5/2020 |
| CN | 111406505 | A | 7/2020 |
| CS | 247426 | B1 | 12/1986 |
| CS | 248318 | B1 | 2/1987 |
| CZ | 17266 | U1 | 2/2007 |
| CZ | 20252 | U1 | 11/2009 |
| DE | 441597 | C | 3/1927 |
| DE | 504035 | C | 7/1930 |
| DE | 2354828 | A1 | 5/1975 |
| DE | 152380 | A1 | 11/1981 |
| DE | 3728669 | A1 | 3/1989 |
| DE | 4431824 | C1 | 5/1996 |
| DE | 19509496 | A1 | 9/1996 |
| DE | 19528663 | A1 | 2/1997 |
| DE | 19718455 | A1 | 11/1997 |
| DE | 19705842 | | 8/1998 |
| DE | 19828355 | A1 | 1/2000 |
| DE | 10050224 | A1 | 4/2002 |
| DE | 10120173 | A1 | 10/2002 |
| DE | 202004015141 | U1 | 12/2004 |
| DE | 102005000770 | B3 | 7/2006 |
| DE | 102005000771 | A1 | 8/2006 |
| DE | 102008021785 | A1 | 11/2009 |
| DE | 102009041646 | A1 | 3/2011 |
| DE | 102010004648 | A1 | 7/2011 |
| DE | 102010038661 | A1 | 2/2012 |
| DE | 102011005400 | A1 | 9/2012 |
| DE | 202012103730 | U1 | 10/2012 |
| DE | 102011052688 | A1 | 2/2013 |
| DE | 102012211001 | A1 | 1/2014 |
| DE | 102012220109 | | 5/2014 |
| DE | 102012223768 | | 6/2014 |
| DE | 102013212151 | A1 | 12/2014 |
| DE | 102013019098 | B3 | 1/2015 |
| DE | 102014108449 | A1 | 2/2015 |
| DE | 2014201203 | A1 | 7/2015 |
| DE | 102014208068 | A1 | 10/2015 |
| DE | 102015006398 | B3 | 5/2016 |
| DE | 102015109799 | A1 | 12/2016 |
| DE | 112015002194 | T5 | 1/2017 |
| DE | 102017204511 | A1 | 9/2018 |
| DE | 102019206734 | A1 | 11/2020 |
| DE | 102019114872 | A1 | 12/2020 |
| EP | 0070219 | B1 | 10/1984 |
| EP | 0355049 | A2 | 2/1990 |
| EP | 845198 | B2 | 6/1998 |
| EP | 0532146 | B1 | 8/1998 |
| EP | 1444879 | A1 | 8/2004 |
| EP | 1219159 | B1 | 6/2005 |
| EP | 1219153 | B1 | 2/2006 |
| EP | 1692928 | A2 | 8/2006 |
| EP | 1574122 | B1 | 2/2008 |
| EP | 1943877 | A2 | 7/2008 |
| EP | 1598586 | B1 | 9/2009 |
| EP | 1731983 | B1 | 9/2009 |
| EP | 2146307 | A2 | 1/2010 |
| EP | 0845198 | B2 | 2/2010 |
| EP | 2186389 | A1 | 5/2010 |
| EP | 2267566 | A2 | 12/2010 |
| EP | 3491192 | A2 | 12/2010 |
| EP | 2057884 | B1 | 1/2011 |
| EP | 2146307 | B1 | 5/2012 |
| EP | 2446732 | A1 | 5/2012 |
| EP | 2524586 | A2 | 11/2012 |
| EP | 2529610 | A1 | 12/2012 |
| EP | 2243353 | B1 | 3/2013 |
| EP | 2174537 | B1 | 5/2013 |
| EP | 2592919 | A1 | 5/2013 |
| EP | 1674324 | B2 | 5/2014 |
| EP | 2759829 | A1 | 7/2014 |
| EP | 2764764 | B1 | 8/2014 |
| EP | 2267566 | A3 | 12/2014 |
| EP | 2191439 | B1 | 3/2015 |
| EP | 2586286 | B1 | 3/2015 |
| EP | 2592919 | B1 | 9/2015 |
| EP | 2921042 | A1 | 9/2015 |
| EP | 2944725 | A1 | 11/2015 |
| EP | 2764764 | B1 | 12/2015 |
| EP | 2510777 | B1 | 3/2016 |
| EP | 2997805 | A1 | 3/2016 |
| EP | 3000302 | A1 | 3/2016 |
| EP | 2868806 | B1 | 7/2016 |
| EP | 3085221 | A1 | 10/2016 |
| EP | 3095310 | A1 | 11/2016 |
| EP | 3097759 | A1 | 11/2016 |
| EP | 2452551 | B1 | 5/2017 |
| EP | 3175691 | A1 | 6/2017 |
| EP | 3195719 | A1 | 7/2017 |
| EP | 3195720 | A1 | 7/2017 |
| EP | 3259976 | A1 | 12/2017 |
| EP | 3262934 | A1 | 1/2018 |
| EP | 3491192 | A1 | 1/2018 |
| EP | 3287007 | A1 | 2/2018 |

(56) References Cited

FOREIGN PATENT DOCUMENTS

| | | |
|---|---|---|
| EP | 3298876 A1 | 3/2018 |
| EP | 3300579 A1 | 4/2018 |
| EP | 3315005 A1 | 5/2018 |
| EP | 3316208 A1 | 5/2018 |
| EP | 2829171 B1 | 6/2018 |
| EP | 2508057 | 7/2018 |
| EP | 2508057 B1 | 7/2018 |
| EP | 3378298 A1 | 9/2018 |
| EP | 3378299 A1 | 9/2018 |
| EP | 2997805 A1 | 10/2018 |
| EP | 3384754 A1 | 10/2018 |
| EP | 3289853 B1 | 3/2019 |
| EP | 3456167 A1 | 3/2019 |
| EP | 3466239 A1 | 4/2019 |
| EP | 3469878 A1 | 4/2019 |
| EP | 3289852 B1 | 6/2019 |
| EP | 3491192 A1 | 6/2019 |
| EP | 3494770 A1 | 6/2019 |
| EP | 3498074 A1 | 6/2019 |
| EP | 3000302 B1 | 8/2019 |
| EP | 3533314 A1 | 9/2019 |
| EP | 3569049 A1 | 11/2019 |
| EP | 3000307 B1 | 12/2019 |
| EP | 3586592 A2 | 1/2020 |
| EP | 3593613 A1 | 1/2020 |
| EP | 3593620 A1 | 1/2020 |
| EP | 3613272 A1 | 2/2020 |
| EP | 3243374 B1 | 3/2020 |
| EP | 3626038 A1 | 3/2020 |
| EP | 3259976 B1 | 4/2020 |
| EP | 3635647 A1 | 4/2020 |
| EP | 3378298 B1 | 5/2020 |
| EP | 3646699 A1 | 5/2020 |
| EP | 3662741 A1 | 6/2020 |
| EP | 3685648 A1 | 7/2020 |
| EP | 2995191 B2 | 10/2020 |
| ES | 2116215 A1 | 7/1998 |
| ES | 2311322 A1 | 2/2009 |
| FI | 5533 A | 11/1913 |
| FR | 1451480 A | 1/1966 |
| FR | 2817344 A1 | 5/2002 |
| FR | 2901291 A | 11/2007 |
| FR | 2901291 A1 | 11/2007 |
| GB | 901081 A | 7/1962 |
| GB | 201519517 A1 | 5/2017 |
| IN | 1632DE2014 A | 8/2016 |
| IN | 01632DE2014 A | 8/2016 |
| IN | 201641027017 A | 10/2016 |
| IN | 202041039250 A | 9/2020 |
| JP | 7079681 A | 11/1882 |
| JP | S60253617 A | 12/1985 |
| JP | S63308110 A | 12/1988 |
| JP | H02196960 A | 8/1990 |
| JP | H02215311 A | 8/1990 |
| JP | H0779681 A | 3/1995 |
| JP | H1066436 A | 3/1998 |
| JP | H10191762 A | 7/1998 |
| JP | 2000352044 A | 12/2000 |
| JP | 2001057809 A | 3/2001 |
| JP | 2002186348 A | 7/2002 |
| JP | 2005227233 A | 8/2005 |
| JP | 2006166871 A | 6/2006 |
| JP | 2011205967 A | 10/2011 |
| JP | 2015070812 A | 4/2015 |
| JP | 2015151826 A | 8/2015 |
| JP | 2015219651 A | 12/2015 |
| JP | 2016071726 A | 5/2016 |
| JP | 2016160808 A | 9/2016 |
| JP | 6087258 B2 | 3/2017 |
| JP | 2017136035 A | 8/2017 |
| JP | 2017137729 A | 8/2017 |
| JP | 2017195804 A | 11/2017 |
| JP | 2018068284 A | 5/2018 |
| JP | 2018102154 A | 7/2018 |
| JP | 2018151388 A | 9/2018 |
| JP | 2019004796 A | 1/2019 |
| JP | 2019129744 A | 8/2019 |
| JP | 2019146506 A | 9/2019 |
| JP | 2019216744 A | 12/2019 |
| JP | 2020018255 A | 2/2020 |
| JP | 2020031607 A | 3/2020 |
| JP | 2020113062 A | 7/2020 |
| JP | 2020127405 A | 8/2020 |
| KR | 100974892 | 8/2010 |
| KR | 100974892 B1 | 8/2010 |
| KR | 20110018582 A | 2/2011 |
| KR | 101067576 B | 9/2011 |
| KR | 101067576 B1 | 9/2011 |
| KR | 101134075 B1 | 4/2012 |
| KR | 101447197 B1 | 10/2014 |
| KR | 101653750 | 9/2016 |
| KR | 20170041377 A | 4/2017 |
| KR | 200485051 Y | 11/2017 |
| KR | 200485051 Y1 | 11/2017 |
| KR | 101873657 B | 8/2018 |
| MX | 06000012 A | 1/2008 |
| PL | 178299 B1 | 4/2000 |
| RO | 130713 | 11/2015 |
| RU | 1791767 C | 1/1993 |
| RU | 2005102554 A | 7/2006 |
| RU | 2421744 C | 6/2011 |
| RU | 2421744 C1 | 6/2011 |
| RU | 2447640 C1 | 4/2012 |
| RU | 2502047 C | 12/2013 |
| RU | 2502047 C1 | 12/2013 |
| RU | 164128 | 8/2016 |
| RU | 2017114139 A | 4/2017 |
| RU | 2017114139 A | 10/2018 |
| RU | 2017114139 A3 | 5/2019 |
| SU | 834514 A1 | 5/1981 |
| SU | 887717 A1 | 12/1981 |
| SU | 1052940 A1 | 11/1983 |
| SU | 1134669 A1 | 1/1985 |
| SU | 1526588 A1 | 12/1989 |
| SU | 1540053 A1 | 1/1991 |
| SU | 1761864 A1 | 9/1992 |
| WO | 1986005353 A1 | 9/1986 |
| WO | 2001052160 A1 | 7/2001 |
| WO | 2002015673 A1 | 2/2002 |
| WO | 2003005803 A1 | 1/2003 |
| WO | 2007050192 A2 | 5/2007 |
| WO | 2009156542 A1 | 12/2009 |
| WO | 2010003421 A1 | 1/2010 |
| WO | 2011104085 A1 | 9/2011 |
| WO | 2012041621 A1 | 4/2012 |
| WO | 2012110508 A1 | 8/2012 |
| WO | 2012110544 A1 | 8/2012 |
| WO | 2013063106 A2 | 5/2013 |
| WO | 2013079247 A1 | 6/2013 |
| WO | 2013086351 A1 | 6/2013 |
| WO | 2013087275 A1 | 6/2013 |
| WO | 2014046685 A1 | 3/2014 |
| WO | 2014093814 A1 | 6/2014 |
| WO | 2014195302 A1 | 12/2014 |
| WO | 2015038751 A1 | 3/2015 |
| WO | 2015153809 A1 | 10/2015 |
| WO | 16020595 A1 | 2/2016 |
| WO | 2016020595 A1 | 2/2016 |
| WO | 2016118686 A1 | 7/2016 |
| WO | 2017008161 A1 | 1/2017 |
| WO | 2017060168 A1 | 4/2017 |
| WO | 2017077113 A1 | 5/2017 |
| WO | 2017096489 A1 | 6/2017 |
| WO | 2017099570 A1 | 6/2017 |
| WO | 2017116913 A1 | 7/2017 |
| WO | 2017170507 A1 | 10/2017 |
| WO | 2017205406 A1 | 11/2017 |
| WO | 2017205410 A1 | 11/2017 |
| WO | 2018043336 A1 | 3/2018 |
| WO | 2018073060 A1 | 4/2018 |
| WO | 2018081759 A1 | 5/2018 |
| WO | 2018112615 | 6/2018 |
| WO | 2018116772 A1 | 6/2018 |
| WO | 2018142768 A1 | 8/2018 |

(56) References Cited

FOREIGN PATENT DOCUMENTS

| | | | |
|---|---|---|---|
| WO | 2018200870 A1 | 11/2018 | |
| WO | 2018206587 A1 | 11/2018 | |
| WO | 2018220159 A1 | 12/2018 | |
| WO | 2018226139 A1 | 12/2018 | |
| WO | 2018235486 A1 | 12/2018 | |
| WO | 2018235942 A1 | 12/2018 | |
| WO | WO18235486 A1 | 12/2018 | |
| WO | 2019034213 A1 | 2/2019 | |
| WO | 2019079205 A1 | 4/2019 | |
| WO | 2019081349 A1 | 5/2019 | |
| WO | 2019091535 A1 | 5/2019 | |
| WO | 2019109191 A1 | 6/2019 | |
| WO | 2019124174 A1 | 6/2019 | |
| WO | 2019124217 A1 | 6/2019 | |
| WO | 2019124225 A1 | 6/2019 | |
| WO | 2019124273 A1 | 6/2019 | |
| WO | 2019129333 A1 | 7/2019 | |
| WO | 2019129334 A1 | 7/2019 | |
| WO | 2019129335 A1 | 7/2019 | |
| WO | 2019215185 A1 | 11/2019 | |
| WO | 2019230358 A1 | 12/2019 | |
| WO | 2020026578 A1 | 2/2020 | |
| WO | 2020026650 A1 | 2/2020 | |
| WO | 2020026651 A1 | 2/2020 | |
| WO | 2020031473 A1 | 2/2020 | |
| WO | 2020038810 A1 | 2/2020 | |
| WO | 2020039312 A1 | 2/2020 | |
| WO | 2020039671 A1 | 2/2020 | |
| WO | 2020044726 A1 | 3/2020 | |
| WO | 2020082182 A1 | 4/2020 | |
| WO | 2020100810 A1 | 5/2020 | |
| WO | 2020110920 A1 | 6/2020 | |
| WO | 2020195007 A1 | 10/2020 | |
| WO | 2020206941 A1 | 10/2020 | |
| WO | 2020206942 A1 | 10/2020 | |
| WO | 2020210607 A1 | 10/2020 | |
| WO | 2020221981 A1 | 11/2020 | |

OTHER PUBLICATIONS

U.S. Appl. No. 16/380,564 Application and Drawings as filed Apr. 10, 2019, 55 pages.
U.S. Appl. No. 16/380,531 Application and Drawings as filed Apr. 10, 2019, 46 pages.
Leu et al., Grazing Corn Residue Using Resources and Reducing Costs, Aug. 2009, 4 pages.
"No-Till Soils", Soil Heath Brochure, 2 pages, last accessed Jul. 14, 2020.
Strickland et al., "Nitrate Toxicity in Livestock" Oklahoma State University, Feb. 2017, 2 pages.
Strickland et al., "Nitrate Toxicity in Livestock" Oklahoma State University, 8 pages, Feb. 2017.
Brownlee, "Neural Networks are Function Approximation Algorithms", Mar. 18, 2020, 13 pages.
Thompson, "Morning glory can make it impossible to harvest corn", Feb. 19, 2015, 3 pages.
Tumlison, "Monitoring Growth Development and Yield Estimation of Maize Using Very High-Resolution Uavimages in Gronau, Germany", Feb. 2017, 63 pages.
Hunt, "Mapping Weed Infestations Using Remote Sensing", 8 pages, Jul. 19, 2005.
Wright, et al., "Managing Grain Protein in Wheat Using Remote Sensing", 12 pages, 2003.
"Malting Barley in Pennsylvania", Agronomy Facts 77, 6 pages, Code EE0179 Jun. 2016.
"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.
Licht, "Influence of Corn Seeding Rate, Soil Attributes, and Topographic Characteristics on Grain Yield, Yield Components, and Grain Composition", 2015, 107 pages.
"Notice of Retraction Virtual simulation of plant with individual stem based on crop growth model", Mar. 5, 2017, 7 pages.
Ma et al., "Identification of Fusarium Head Blight in Winter Wheat Ears Using Continuous Wavelet Analysis", Dec. 19, 2019, 15 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
Hanna, "Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.
"Grazing Corn Residues" (http://www.ca.uky.edu), 3 pages, Aug. 24, 2009.
Jarnevich et al., Forecasting Weed Distributions Using Climate Data: A GIS Early Warning Tool, Downloaded on Jul. 13, 2020, 12 pages.
Combine Cutting and Feeding Mechanisms in the Southeast, By J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.
S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) By Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.
U.S. Appl. No. 16/380,531 Office Action dated Oct. 21, 2020, 9 pages.

(56) References Cited

OTHER PUBLICATIONS

Application and Drawings for U.S. Appl. No. 16/175,993, filed Oct. 31, 2018, 28 pages.
Application and Drawings for U.S. Appl. No. 16/380,623, filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells ,N., Reardon-Smith, K, Richardson, L, McDougall, K, and Basnet, B.B., 2008. Predictive mapping of blackberry in the Condamine Catchment using logistic regression and spatial analysis. In Proceedings of the 2008 Queensland Spatial Conference: Global Warning: What's Happening in Paradise. Spatial Sciences Institute.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Provisional Application and Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings as filed Oct. 9, 2020, 63 pages.
U.S. Appl. No. 17/066,442 Application and Drawings as filed Oct. 8, 2020, 65 pages.
U.S. Appl. No. 16/380,550, filed Apr. 10, 2019, Application and Drawings, 47 pages.
U.S. Appl. No. 17/066,999 Application and Drawings as filed Oct. 9, 2020, 67 pages.
U.S. Appl. No. 17/066,444 Application and Drawings as filed Oct. 8, 2020, 102 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Duzzy Algorithm," 2010, Publisher: IEEE.
Dan et al., "On-the-go Througout Prediction in a Combine Harvester Using Sensor Fusion," 2017, Publisher: IEEE.
Fernandez-Quintanilla et al., "Is the current state of the art of weed monitoring sutible for site-specific weed management in arable crops?", First Published May 1, 2018, 4 pages.
Dionysis Bochtis et al. "Field Operations Planning for Agricultural Vehicles: A Hierarchical Modeling Framework." Agricultural Engineering International: the CIGR Ejournal. Manuscript PM 06 021. vol. IX. Feb. 2007, pp. 1-11.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6.
Yi et al., "An Efficient MAC Protocol With Adaptive Energy Harvesting for Machine-to-Machine Networks," 2015, vol. 3, Publisher: IEEE.
Application and Drawings for U.S. Appl. No. 16/171,978, filed Oct. 26, 2018, 53 pages.
European Search Report issued in European Patent Application No. 19203883.4 dated Mar. 23, 2020 (10 pages).
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
S. Veenadhari et al., "Machine Learning Approach for Forecasting Crop Yield Based on Climatic Parameters", 2014 International Conference on Computer Communication and Informatics (ICCCI-2014) Jan. 3-6, 2014, Coimbatore, India, 5 pages.
Non-Final Office Action for U.S. Appl. No. 16/380,531 dated Oct. 21, 2020, 10 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, Video: Canadian cage mill teams up with JD (https://www.producer.com/2019/12/video-canadian-cage-mill-teams-up-with-jd/) , 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGI4&list=PL1KGsSJ4CWk4rShNb3-sTMOIiL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.
Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component_Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
Apan, A., Wells, N., Reardon-Smith, K, Richardson, I, McDougall, K, and Basnet, B.B., 2008. Predictive mapping of blackberry in the

(56) References Cited

OTHER PUBLICATIONS

Condamine Catchment using logistic regression and spatial analysis. In Proceedings of the 2008 Queensland Spatial Conference: Global Warning: What's Happening in Paradise. Spatial Sciences Institute, 11 pages.

U.S. Appl. No. 17/067,383 Application and Drawings as filed Oct. 9, 2020, 61 pages.

Zhigen et al., "Research of the Combine Harvester Load Feedback Control System Using Multi-Signal Fusion Method and Fuzzy Algorithm," 2010, Publisher: IEEE, 5 pages.

Dan et al., "On-the-go Throughout Prediction in a Combine Harvester Using Sensor Fusion," 2017, Publisher: IEEE, 6 pages.

Mei-Ju et al., "Two paradigms in cellular Internet-of-Things access for energy-harvesting machine-to-machine devices: push-based versus pull-based," 2016, vol. 6, 9 pages.

Yi et al., "An Efficient MAC Protocol With Adaptive Energy Harvesting for Machine-to-Machine Networks," 2015, vol. 3, Publisher: IEEE, 10 pages.

Lamsal et al. "Sugarcane Harvest Logistics in Brazil" Iowa Research Online, Sep. 11, 2013, 27 pages.

Jensen, "Algorithms for Operational Planning of Agricultural Field Operations", Mechanical Engineering Technical Report ME-TR-3, Nov. 9, 2012, 23 pages.

Chauhan, "Remote Sensing of Crop Lodging", Nov. 16, 2020, 16 pages.

Extended European Search Report and Written Opinion issued in European Patent Application No. 20208171.7, dated May 11, 2021, in 05 pages.

Cordoba, M.A., Bruno, C.I. Costa, J.L. Peralta, N.R. and Balzarini, M.G., 2016, Protocol for multivariate homegeneous zone delineation in precision agriculture, biosystems engineering, 143, pp. 95-107.

Prosecution History for U.S. Appl. No. 16/380,691 including: Notice of Allowance dated Mar. 10, 2021 and Application and Drawings filed Apr. 10, 2019, 46 pages.

U.S. Appl. No. 16/831,216 Application and Drawings filed Mar. 26, 2020, 56 pages.

Notice of Allowance for U.S. Appl. No. 16/380,531 dated Apr. 5, 2021, 5 pages.

Martin et al., "Breakage Susceptibility and Harness of Corn Kernels of Various Sizes and Shapes", May 1987, 10 pages.

Jones et al., "Brief history of agricultural systems modeling" Jun. 21, 2016, 15 pages.

Dan Anderson, "Brief history of agricultural systems modeling" 1 pages. Aug. 13, 2019.

A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.

Carmody, Paul, "Windrowing and harvesting", 8 pages Date: Feb. 3, 2010.

Dabney, et al., "Forage Harvest Representation in RUSLE2", Published Nov. 15, 2013, 17 pages.

John Deere S-Series Combines S760, S770, S780, S790 Brochure, 44 pages, Nov. 15, 2017.

Sekhon et al., "Stalk Bending Strength is Strongly Assoicated with Maize Stalk Lodging Incidence Across Multiple Environments", Jun. 20, 2019, 23 pages.

Thomison et al. "Abnormal Corn Ears", Apr. 28, 2015, 1 page.

Anderson, "Adjust your Combine to Reduce Damage to High Moisture Corn", Aug. 13, 2019, 11 pages.

Sumner et al., "Reducing Aflatoxin in Corn During Harvest and Storage", Reviewed by John Worley, Apr. 2017, 6 pages.

Sick, "Better understanding corn hybrid characteristics and properties can impact your seed decisions", 8 pages, Sep. 21, 2018.

TraCI/Change Vehicle State—SUMO Documentation, 10 pages, Retrieved Dec. 11, 2020.

Arnold, et al., Chapter 8. "Plant Growth Component", Jul. 1995, 41 pages.

Humburg, Chapter: 37 "Combine Adjustments to Reduce Harvest Losses", 2019, South Dakota Board of Regents, 8 pages.

Hoff, "Combine Adjustments", Cornell Extension Bulletin 591, Mar. 1943, 10 pages.

University of Wisconsin, Corn Agronomy, Originally written Feb. 1, 2006 | Last updated Oct. 18, 2018, 2 pages.

University of Nebraska—Lincoln, "Combine Adjustments for Downed Corn—Crop Watch", Oct. 27, 2017, 5 pages.

"Combine Cleaning: Quick Guide to Removing Resistant Weed Seeds (Among Other Things)", Nov. 2006, 5 pages.

Dekalb, "Corn Drydown Rates", 7 pages, Aug. 4, 2020.

Mahmoud et al. Iowa State University, "Corn Ear Orientation Effects on Mechanical Damage and Forces on Concave", 1975, 6 pages.

Sindelar et al., Kansas State University, "Corn Growth & Development" Jul. 17, 2017, 9 pages.

Pannar, "Manage the Growth Stages of the Maize Plant With Pannar", Nov. 14, 2016, 7 pages.

He et al., "Crop residue harvest impacts wind erodibility and simulated soil loss in the Central Great Plains", Sep. 27, 2017, 14 pages.

Blanken, "Designing a Living Snow Fence for Snow Drift Control", Jan. 17, 2018, 9 pages.

Jean, "Drones give aerial boost to ag producers", Mar. 21, 2019, 4 pages.

Zhao et al., "Dynamics modeling for sugarcane sucrose estimation using time series satellite imagery", Jul. 27, 2017, 11 pages.

Brady, "Effects of Cropland Conservation Practices on Fish and Wldlife Habitat", Sep. 1, 2007, 15 pages.

Jasa, et al., "Equipment Adjustments for Harvesting Soybeans at 13%-15% Moisture", Sep. 15, 2017, 2 pages.

Bendig et al., "Estimating Biomass of Barley Using Crop Surface Models (CSMs) Derived from UAV-Based RGB Imaging", Oct. 21, 2014, 18 pages.

Robertson, et al., "Maize Stalk Lodging: Morphological Determinants of Stalk Strength", Mar. 3, 2017, 10 pages.

MacGowan et al. Purdue University, Corn and Soybean Crop Depredation by Wildlife, Jun. 2006, 14 pages.

Martinez-Feria et al., Iowa State University, "Corn Grain Dry Down in Field From Maturity to Harvest", Sep. 20, 2017, 3 pages.

Wrona, "Precision Agriculture's Value" Cotton Physiology Today, vol. 9, No. 2, 1998, 8 pages.

Zhang et al., "Design of an Optical Weed Sensor Using Plant Spectral Characteristics" Sep. 2000, 12 pages.

Hunt, et al., "What Weeds Can Be Remotely Sensed?", 5 pages, May 2016.

Pepper, "Does An Adaptive Gearbox Really Learn How You Drive?", Oct. 30, 2019, 8 pages.

Eggerl, "Optimization of Combine Processes Using Expert Knowledge and Methods of Artificial Intelligence", Oct. 7, 1982, 143 pages.

Sheely et al., "Image-Based, Variable Rate Plant Growth Regulator Application in Cotton at Sheely Farms in California", Jan. 6-10, 2003 Beltwide Cotton Conferences, Nashville, TN, 17 pages.

Kovacs et al., "Physical characteristics and mechanical behaviour of maize stalks for machine development", Apr. 23, 2019, 1-pages.

Anonymously, "Optimizing Crop Profit Across Multiple Grain Attributes and Stover", ip.com, May 26, 2009, 17 pages.

Breen, "Plant Identification: Examining Leaves", Oregon State University, 2020, 8 pages.

Caglayan et al., A Plant Recognition Approach Using Shape and Color Features in Leaf Images, Sep. 2013, 11 pages.

Casady et al., "Precision Agriculture" Yield Monitors University of Missouri—System, 4 pages, 1998.

Apan et al., "Predicting Grain Protein Content in Wheat Using Hyperspectral Sensing of In-season Crop Canopies and Partial Least Squares Regression" 18 pages, 2006.

Xu et al., "Prediction of Wheat Grain Protein by Coupling Multisource Remote Sensing Imagery and ECMWF Data", Apr. 24, 2020, 21 pages.

Day, "Probability Distributions of Field Crop Yields," American Journal of Agricultural Economics, vol. 47, Issue 3, Aug. 1965, Abstract Only, 1 page.

(56) References Cited

OTHER PUBLICATIONS

Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
K.R. Manjunath et al., "Developing Spectral Library of Major Plant Species of Western Himalayas Using Ground Observations", J Indian Soo Remote Sen (Mar. 2014) 42(a):201:216 17 pages.
Application and Drawings for U.S. Appl. No. 17/067,383, filed Oct. 9, 2020, 61 pages.
Pioneer Estimator, "Corn Yield Estimator" accessed on Feb. 13, 2018, 1 page. retrieved from: https://www.pioneer.com/home/site/us/tools-apps/growing-tools/corn-yield-estimator/.
Guindin, N. "Estimating Maize Grain Yield From Crop Biophysical Parameters Using Remote Sensing", Nov. 4, 2013, 19 pages.
EP Application No. 19203883.4-1004 Office Action dated May 3, 2021, 4 pages.
Iowa State University Extension and Outreach, "Harvest Weed Seed Control", Dec. 13, 2018, 6 pages. https://crops.extension.iastate.edu/blog/bob-hartzler/harvest-weed-seed-control.
Getting Rid of WeedsThrough Integrated Weed Management, accessed on Jun. 25, 2021, 10 pages. https://integratedweedmanagement.org/index.php/iwm-toolbox/the-harrington-seed-destructor.
The Importance of Reducing Weed Seeds, Jul. 2018, 2 pages. https://www.aphis.usda.gov/plant_health/soybeans/soybean-handouts.pdf.
Alternative Crop Guide, Published by the Jefferson Institute, "Buckwheat", Revised Jul. 2002. 4 pages.
Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.
Feng-jie, X., Er-da, W. and Feng-yuan, X., Crop area yield risk evaluation and premium rates calculation—Based on nonparametric kernel density estimation. In 2009 International Conference on Management Science and Engineering, 7 pages.
Liu, R. and Bai, X., 2014, May. Random fuzzy production and distribution plan of agricultural products and its PSO algorithm. In 2014 IEEE International Conference on Progress in Informatics and Computing (pp. 32-36). IEEE.
Notice of Allowance for U.S. Appl. No. 16/171,978 dated Mar. 31, 2021, 6 pages.
Apan et al., "Predictive Mapping of Blackberry in the Condamine Catchment Using Logistic Regressiona dn Spatial Analysis", Jan. 2008, 12 pages.
Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Martinez-Feria et al., "Evaluating Maize and Soybean Grain Dry-Down In the Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.

Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Morrison, "Should You Use Tillage to Control Resistant Weeds", Aug. 29, 2014, 9 pages.
Morrison, "Snow Trapping Snars Water", Oct. 13, 2005, 3 pages.
"Soil Zone Index", https://www.satimagingcorp.com/applications/natural-resources/agricultu . . . , Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed to Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (© 2001 American Society of Agricultural Engineers), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery for Detection of European Corn Borer Infestation in Iowa Corn Plots", Nov. 2008, 11 pages.
Agriculture, "Using drones in agriculture and capturing actionable data", Retrieved Dec. 11, 2020, 18 pages.
Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (*Spodoptera frugiperda*) in maize at a regional scale", Apr. 10, 2015, 14 pages.
Booker, "Video: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University—Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-

(56) References Cited

OTHER PUBLICATIONS farmers-and-ranchers/crops-and-irrigation/field-crops/cereals-barley-wheat-oats-triticale/wheat-winter-wheat) 5 pages, last accessed Jul. 14, 2020.

Quora, "Why would I ever use sport mode in my automatic transmission car? Will this incrase fuel efficiency or isit simply a feature that makes form more fun when driving?", Aug. 10, 2020, 5 pages.

Wade, "Using a Drone's Surface Model to Estimate Crop Yields & Assess Plant Health", Oct. 19, 2015, 14 pages.

Mathyam et al., "Remote Sensing of Biotic Stress in Crop Plants and Its Applications for Pest Stress", Dec. 2011, 30 pages.

"Four Helpful Weed-Management Tips for Harvest Time", 2 pages, Sep. 4, 2019.

Franz et al., "The role of topography, soil, and remotely sensed vegetation condition towards predicting crop yield", University of Nebraska—Lincoln, Mar. 23, 2020, 44 pages.

Peiffer et al., The Genetic Architecture of Maize Stalk Strength:, Jun. 20, 2013, 14 pages.

Martin et al. Breakage Susceptibiltiy and Hardness of Corn Kernels of Various Sizes and Shapes, vol. 3( ): May 1087, 10 pages. https://pdfs.semanticscholar.org/e579/1b5363b6a78efd44adfb97755a0cdd14f7ca.pdf.

Hoff, "Combine Adjustments" (https://smallfarmersjournal.com/combine-adjustments/), Mar. 1943, 9 pages.

Optimizing Crop Profit Across Multiple Grain Attributes and Stover, Electronic Publication Date May 26, 2009, 17 pages.

Unglesbee. Soybean Pod Shatter—Bad Enough to Scout Before Harvest—DTN, Oct. 17, 2018, 11 pages. Susceptibility to shatter (https://agfax.com/2018/10/17/soybean-pod-shatter-bad-enough-to-scout-before-harvest-dtn/).

GIS Maps for Agricultural, accessed on May 10, 2022, 7 pages. https://www.satimagingcorp.com/services/geographic-information-systems/gis-maps-agriculture-mapping.

https://wingtra.com/drone-mapping-applications/use-of-drones-in-agriculture, accessed on May 10, 2022, 19 pages.

Energy Requirement Model for a Combine Harvester: Part 1: Development of Component Models, Published online Dec. 22, 2004, 17 pages.

Energy Requirement Model for a Combine Harvester, Part 2: Integration of Component Models, Published online Jan. 18, 2005, 11 pages.

Pioneer on reducing soybean harvest losses including combine adjustments (last accessed Jul. 23, 2020) (https://www.pioneer.com/us/agronomy/reducing_harvest_losses_in_soybeans.html), 5 pages.

\* cited by examiner

ZONAL MACHINE CONTROL

FIELD OF THE DESCRIPTION

The present description relates to controlling a work machine. More specifically, the present description relates to controlling subsystems of a work machine differently, in different geographic areas, based upon a predictive map.

BACKGROUND

There are a wide variety of different types of work machines. They include machines such as construction machines, turf management machines, forestry machines, agricultural machines, etc. In some current systems, a priori data is collected and used to generate a predictive map that predicts one or more different variables, that may be relevant to controlling the work machine, for a particular worksite. The map maps the variables to different geographic locations on the worksite. The maps are then used in an attempt to control the machine as it travels about the worksite performing an operation.

One particular example is in controlling an agricultural harvester. Some current systems attempt to collect a priori data (such as aerial imagery) and generate a predictive yield map from the a priori data. The predictive yield map maps predicted yield values, in a field being harvested, to geographic locations in that field. The systems attempt to control the work machine based upon the predictive yield map, as it travels through the field being harvested.

Thus, there has a been a relatively large amount of work done in attempting to predict yield from aerial imagery data.

The discussion above is merely provided for general background information and is not intended to be used as an aid in determining the scope of the claimed subject matter.

SUMMARY

A work machine receives a thematic map that maps values of a variable to different geographic locations at a worksite. Control zones are dynamically identified on the thematic map and actuator settings are dynamically identified for each control zone. A position of the work machine is sensed, and actuators on the work machine are controlled based upon the control zones that the work machine is in, or is entering, and based upon the settings corresponding to the control zone. These control zones and settings are dynamically adjusted based on in situ (field) data collected by sensors on the work machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
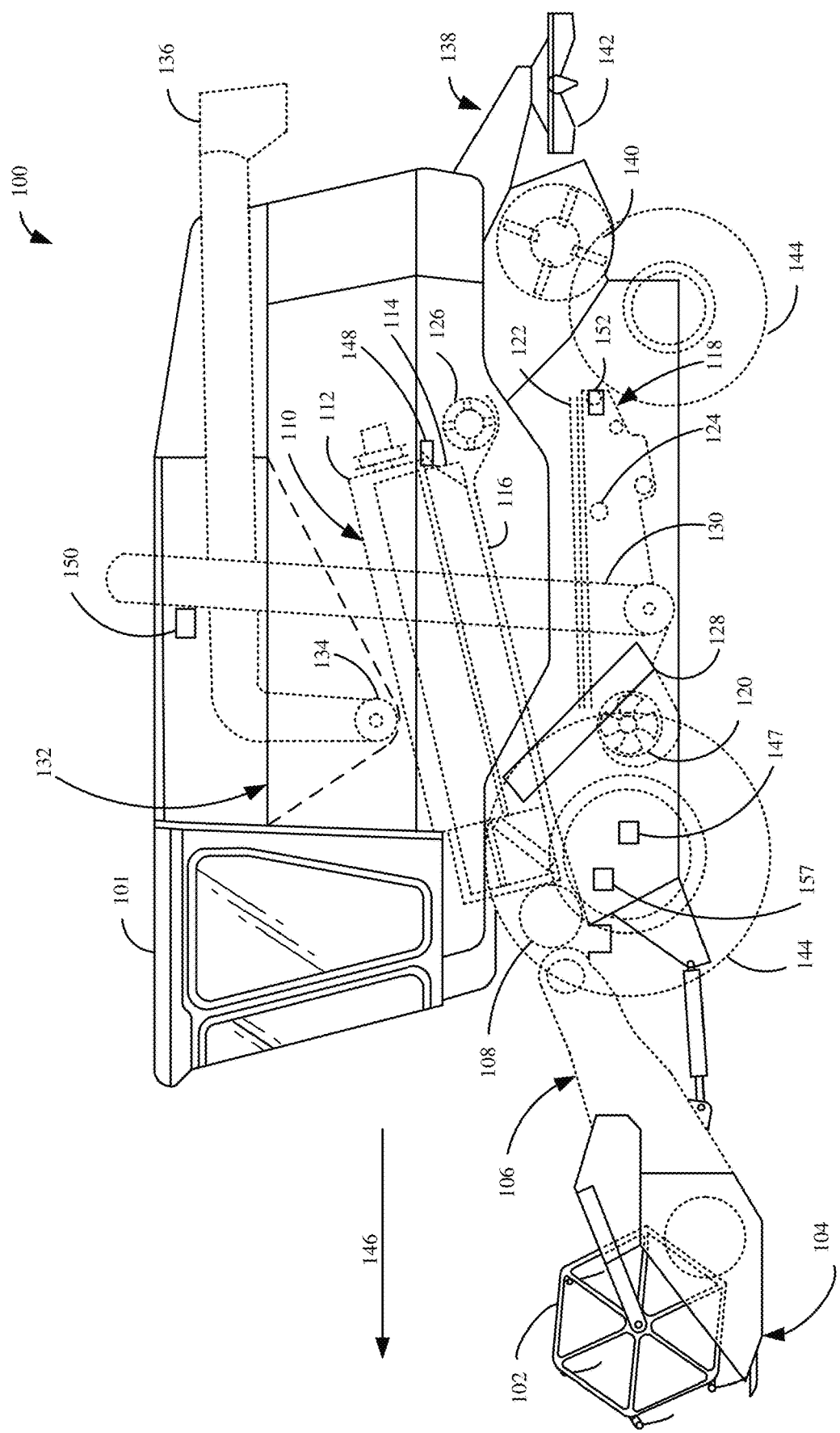
FIG. 1 is a partial pictorial, partial block diagram of a work machine in an example where it is a combine harvester.

As discussed above, some current systems have attempted to use a thematic map (such as a yield map) created from a priori data (such as aerial imagery data or historical data) in order to control the work machine (such as a harvester). However, this can present a number of difficulties. For instance, the thematic map (generated based on a priori data) may be inaccurate. Similarly, many such systems have attempted to control the work machine based upon instantaneous values of the variables reflected in the thematic map (e.g., based upon the instantaneous yield values, given the location of the harvester in the field). This can also present difficulties. By way of example, it may be that the actuators on the work machine are not responsive enough to adjust quickly enough to the instantaneous changes in those values. Similarly, different actuators may react differently to different variables. Thus, attempting to control all, or large subsets, of the controllable subsystems on the work machine, based upon a particular thematic map (such as a yield map) may result in poor control of the machine.

Thus, the present description is directed to a work machine that can receive a thematic map and generate control signals based upon that thematic map, but that can also iteratively and dynamically modify the thematic map (or data derived from the thematic map) based upon in situ, field, data that is detected by sensors on the work machine, as the work machine is performing its operation. In another example, the present description describes a work machine that breaks the control model (e.g., the predictive thematic map) into control zones, by clustering the variable values represented on the thematic map. This avoids the control system on the work machine attempting to control the work machine based upon instantaneous values (or discrete values) on the predictive map. Instead, the values are clustered and control zones are defined. Each control zone has a set of settings for the controllable subsystems, or work machine actuators, so that, as the work machine enters a particular control zone, the controllable subsystems (or work machine actuators) are controlled based upon the corresponding settings in that control zone. The control zones and corresponding settings can also be iteratively and dynamically updated, based upon in situ data.

The present description also describes an example of a work machine in which different sets of control zones are identified, and corresponding settings are also identified for those different sets of control zones, on a per-subsystem or per-work machine actuator basis. That is, each controllable subsystem may have its own set of control zones that are not necessarily related to the control zones for other controllable subsystems. The control zones can be specific to subsets of controllable subsystems, or subsets of controllable work machine actuators, or they can be generated for individual, controllable subsystems or individual work machine actuators, and be specifically tailored to those subsystems or actuators.

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100, as will be discussed in more detail below. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine (or other power source) that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other implementations, the residue is simply dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. That residue can also be moved rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152, and position sensor 157. Ground speed sensor 147 illustratively senses the travel speed of combine 100 over the ground. This can be done by sensing the speed of rotation of the wheels, the drive shaft, the axel, or other components. The travel speed and position of combine 100 can also be sensed by positioning system 157, such as a global positioning system (GPS), a dead reckoning system, a LORAN system, a cellular triangulation system, or a wide variety of other systems or sensors that provide an indication of travel speed and/or position.

Cleaning shoe loss sensors 152 illustratively provide an output signal indicative of the quantity of grain loss by both the right and left sides of the cleaning shoe 118. In one example, sensors 152 are strike sensors (or impact sensors) which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation or pose of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense yield as mass flow rate of grain through elevator 130, correlated to a position from which it was harvested, as indicated by position sensor 157, or provide other output signals indicative of other sensed variables. Some additional examples of the types of sensors that can be used are described below.

Figure 2:
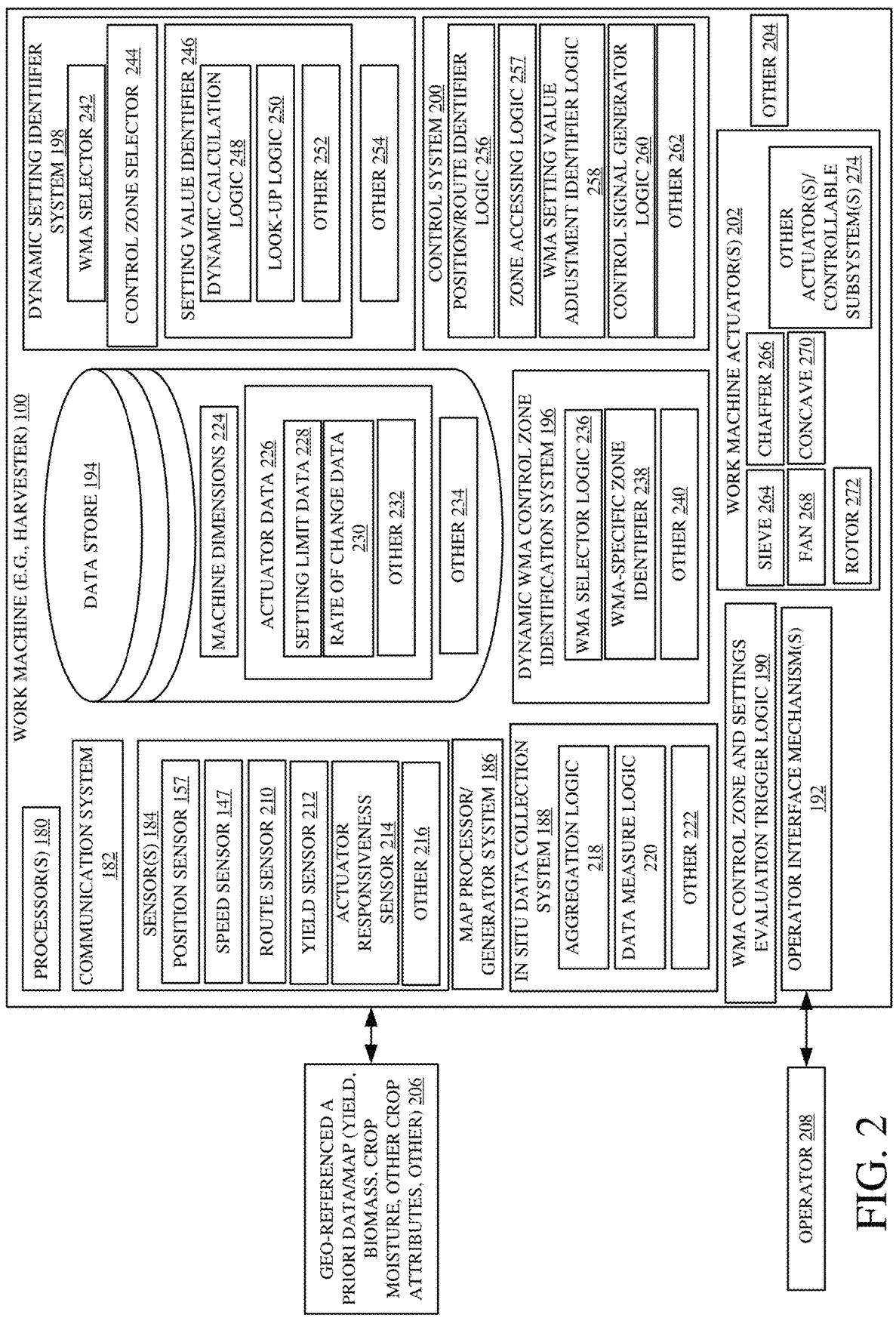
FIG. 2 is a block diagram showing one example of the work machine shown in FIG. 1, with portions illustrated in more detail.

FIG. 2 is a block diagram showing some parts of the combine (work machine) 100, illustrated in FIG. 1, in more detail. Thus, FIG. 2 shows that work machine 100 can include one or more processors 180, communication system 182, sensors 184 (which can be the same or different sensors from those described above with respect to FIG. 1), a map processor/generator system 186, in situ data collection system 188, work machine actuator (WMA) control zone and settings evaluation trigger logic 190, operator interface mechanisms 192, data store 194, dynamic WMA control zone identification system 196, dynamic setting identifier system 198, control system 200, work machine actuators 202, and it can include a wide variety of other items 204.

The example shown in FIG. 2 also shows that work machine 100 can illustratively receive geo-referenced a priori data or map 206. The a priori data or map may be geo-referenced yield data, biomass data, crop moisture data, other crop attribute data, or a wide variety of other geo-referenced a priori data. In one example, the geo-referenced a priori data or map 206 can be received from a remote server environment or from another remote system over a network. Thus, the network may include a wide area network, a local area network, a near field communication network, a cellular communication network, or any of a wide variety of other networks or combinations of networks.

The example in FIG. 2 also shows that operator 208 interacts with operator interface mechanisms 192 in order to control and manipulate work machine 100. Thus, operator interface mechanisms 192 can include a steering wheel, joysticks, levers, pedals, buttons and switches, actuatable inputs on a user interface display which can be actuated by a point and click device (or, where the display is a touch sensitive display, they can be actuated by touch gestures), speech recognition functionality so that the operator 208 can provide an input through a microphone and receive speech synthesis outputs through a speaker, or a wide variety of other audio, visual, or haptic interface mechanisms.

Before describing the operation of work machine 100, in generating control zones and controlling the controllable subsystems 202 using those control zones, a brief description of some of the items illustrated in FIG. 2, and their operation, will first be described.

Communication system 182 is illustratively configured to allow items in work machine 100 to communicate with one another, and to communicate with other items, such as remote computing systems, hand held devices used by operator 208, or other items. Depending on the items that work machine 100 is communicating with, communication system 182 enables that type of communication.

Sensors 184 can include position sensor 157, speed sensor 147, route sensor 210, yield sensor 212, actuator responsiveness sensor 214, and it can include other items 216. As discussed above, position sensor 157 may be a GPS receiver, or any of a wide variety of other sensors that generate an output indicative of a geographic location of work machine 100. Speed sensor 147 generates an output indicative of the ground speed of work machine 100. Route sensor 210 can sense a heading, orientation, or pose of work machine 100 so that, when combined with the speed of work machine 100, and its current geographic position, it can identify a historic, and extrapolate a future, route that work machine is traveling. Route sensor 210 can identify the route of work machine 100 in other ways as well.

Yield sensor 212 illustratively generates an output indicative of a current yield being encountered by work machine 100. As discussed above, the yield sensor 212 can be a mass flow sensor that senses a mass flow of grain into the clean grain tank of machine 100. That can be correlated to a geographic position of machine 100 where that grain was harvested, in order to identify an actual yield, over different geographic locations in the field being harvested.

Actuator responsiveness sensor 214 can illustratively generate an output indicative of the responsiveness of the work machine actuators 202. By way of example, under certain wear conditions, or under different environmental conditions, the actuators may react more quickly or more slowly. By way of example, when a work machine 100 is beginning an operation, and the weather is relatively cold, some hydraulic actuators may respond more slowly than when the work machine is performing the same operation in relatively warm weather. Similarly, after the different actuators undergo a great deal of wear, they may respond differently. These are just some example of how the responsiveness of the different work machine actuators 202 may change over time, or under different conditions.

Map processor/generator system 186 illustratively processes the geo-referenced a priori data 206 that is received. When it is received in the form of a map, that maps variable values to different geographic locations on the field, system 186 illustratively parses that map to identify the values and the corresponding geographic locations. Where the data is raw geo-referenced data, it parses that data as well in order to obtain the same types of values. Similarly, where it receives multiple different maps reflecting multiple different attributes, it processes each of those maps, or each of those sets of a priori data, to obtain the variable values and their corresponding geographic locations.

In situ data collection system 188 monitors and collects the data generated by sensors 184. It illustratively includes aggregation logic 218, data measure logic 220, and it can include other items 222. Aggregation logic 218 illustratively aggregates the data from different sensors, according to different criteria. For instance, it can aggregate values over time, over distance traveled by machine 100, over a particular number of readings for each of the sensors, etc. Data measure logic 220 illustratively measures the amount of data that has been aggregated and provides it to WMA control zone and setting evaluation trigger logic 190.

Logic 190 detects any of a variety of different types of triggers that can be used to generate or modify the control zones and settings values based upon the in situ data collected by in situ data collection system 188. Thus, in one example, trigger logic 190 can be configured to initiate a control zone and settings evaluation process intermittently, every time a certain amount of in situ data has been collected by system 188. By way of example, trigger logic 190 may be triggered after in situ data collection system 188 has collected data from sensors 184, while work machine 100 has traveled a particular distance (such as 10 meters). In that case, every time work machine 100 travels 10 meters, and the corresponding in situ data has been aggregated from sensors 184, the control zones and settings values that control system 200 is using to control the work machine actuators 202 will be evaluated and adjusted, if necessary, based upon the ground truth data generated from the sensors. Trigger logic 190 can detect other triggers as well, such as a number of data points that have been aggregated by in situ data collection system 188, an amount of time that has passed during which work machine 100 is performing the operation, or other trigger criteria.

Data store 194 illustratively includes machine dimensions 224, actuator data 226 (which, itself, can include setting limit data 228 and rate of change limit data 230, as well as other items 232), and other data items 234. Machine dimensions 225 can be used in setting the control zones. For instance, the dimensions may indicate the width of the header 102 of machine 100. That can be used to identify the width of the control zones that are used to control work machine actuators 202.

Similarly, each of the work machine actuators 202 may have a particular setting limit and a rate of change limit. The setting limit may indicate the opposite extreme ends of actuation of the corresponding actuator, while the rate of change limit may indicate how quickly a given actuator can respond to an actuation input, under different circumstances (such as under different temperature conditions, wear conditions, etc.). The setting limits and responsiveness can be sensed as well, as discussed above with respect to sensor 214.

Dynamic WMA control zone identification system 196 illustratively includes WMA selector loge 236, WMA-specific zone identifier 238, and it can include other items 240. WMA selector logic 236 illustratively selects one of the work machine actuators 202 for which control zones are to be identified or dynamically updated or modified based upon in situ data. For instance, it may be that system 196 first selects the sieve actuator 202. WM A-specific zone identifier 238 then identifies the control zones for the sieve actuator, given the data provided by map processor/generator system 186. When that is finished, WMA selector logic 236 can select a next work machine actuator for which control zones are to be identified. This is described in greater detail below with respect to FIGS. 3-6.

Dynamic setting identifier system 198 illustratively includes WMA selector 242, control zone selector 244, and setting value identifier 246 (which, itself, can include dynamic calculation logic 248, lookup logic 250, and/or a wide variety of other items 252). Dynamic system identifier 198 can also include other items 254. WMA selector 242 first selects a particular actuator for which control zone settings values are to be generated. Control zone selector 244 then identifies one or more different control zones that were identified by system 196, for this particular work machine actuator, for which settings values are to be generated. Setting value identifier 246 then identifies the settings values for that particular control zone, for the selected work machine actuator. Therefore, any time work machine 100 is about to enter the corresponding control zones, the corresponding actuator is set to the identified settings values for that control zone, for that actuator.

In identifying the particular settings values for a control zone, dynamic calculation logic 248 can dynamically calculate a settings value, based upon the geo-referenced a priori data provided by map processor/generator system 186, and based upon the in situ data collected by system 188. For instance, it may be that the predicted yield value in the geo-referenced a priori data 206 may need to adjusted based upon the actual yield data that has been collected by the in situ sensors. In that case, dynamic calculation logic 248 can generate or modify the settings values for a set of control zones based upon the predicted value, from the a priori data, as corrected by the actual value, generated by the in situ sensors.

Lookup logic 250 can illustratively identify settings values for different control zones, for different work machine actuators, by performing a lookup operation. For instance, it may be that the a priori predicted yield data, as corrected by the in situ data, is stored in a lookup table indexed by geographic location. Based upon the geographic location of the control zones identified by the dynamic WMA control zone identification system 196, lookup logic 250 can look up settings values, for that control zone, at that geographic location, for the specific work machine actuator being controlled based on that control zone.

The settings values can of course be identified in other ways as well.

Once the control zones have been identified (or updated) and the settings values for each of the control zones have been generated (or updated) this information is provided to control system 200. Control system 200 then generates control signals to control work machine actuators 202, based upon that data. Therefore, in one example, control system 200 includes position/route identifier logic 256, zone accessing logic 257, WMA setting value adjustment identifier logic 258, control signal generator logic 260, and it can include other items 262.

Position/route identifier logic 256 identifies a current position of work machine 100, and a geographic position that will be occupied by work machine 100 in the near future. For instance, it can identify a current position of work machine 100 based upon the output of position sensor 157 and it can identify a next geographic position of work machine 100 based upon the route sensed by route sensor 210 and the speed output by speed sensors 147.

Zone accessing logic 257 then identifies the control zone (or different control zones for different actuators) that work machine 100 is in, and/or is about to enter. WMA setting value adjustment identifier logic 258 identifies whether the settings values for the different work machine actuators 202 will need to be adjusted, based upon the current and next position of work machine 100.

For instance, if work machine 100 is in the middle of a particular control zone, and it will be in that same control zone, for a given actuator, for the next 30 meters, then no settings adjustments need to be made. However, if the work machine 100 is near the boundary of two control zones (for a given actuator) then the settings value for that actuator will need to be changed in the near future. WMA setting value adjustment identifier logic 258 identifies that adjustment that will need to be made (such as its direction and magnitude) and control signal generator logic 260 generates control signals to control the work machine actuators 202 accordingly.

For instance, if work machine 100 is near the boundary of two control zones, and the magnitude of the adjustment is relatively large, as indicated by logic 258, control signal generator logic 260 can begin to actuate the actuator so that it reaches its new setting value (for the subsequent control zone that machine 100 is approaching) at the time, or shortly after the time, when work machine 100 enters that control zone. Thus, given the responsiveness of the actuator and the magnitude of the change in the setting values from the current control zone to the next control zone, control signal generator logic 260 identifies a geographic location where it will need to actuate the actuator to make the settings adjustment to correspond with the control zone boundary crossing.

It will be noted that control system 200 can, substantially simultaneously, generate control signals for multiple different work machine actuators 202 based upon the actuator-specific control zones and setting values for each actuator.

Work machine actuators 202 can include a sieve actuator 264, a chaffer actuator 266, a fan actuator 268, a concave actuator 270, a rotor actuator 272, and it can include a wide variety of other actuators or controllable subsystems 274, such as an engine, drivetrain actuator, feedrate adjustment actuator, header height actuator, etc. The sieve actuator 264 can illustratively be actuated in order to change the sieve settings. Chaffer actuator 266 may be an actuator that can be actuated to change the chaffer settings. The fan actuator 268 may be actuated to change the fan speed of the cleaning fan or other fans in work machine 100. Concave actuator 270 can be actuated to change the concave clearance. Rotor actuator 272 can be actuated to change the rotor speed or other operational parameters. Therefore, as work machine 100 travels across the field, it may enter different control zones that each have settings values for different work machine actuators 202. The control zones for one work machine actuator 202 may not necessarily correspond to the control zones for another actuator. Therefore, independent, actuator-specific control zones can be generated and settings values can be set for each of those control zones so that control system 200 can, substantially simultaneously, control all of the work machine actuators 202 based upon their individual control zones and individual setting values.

Figure 3:
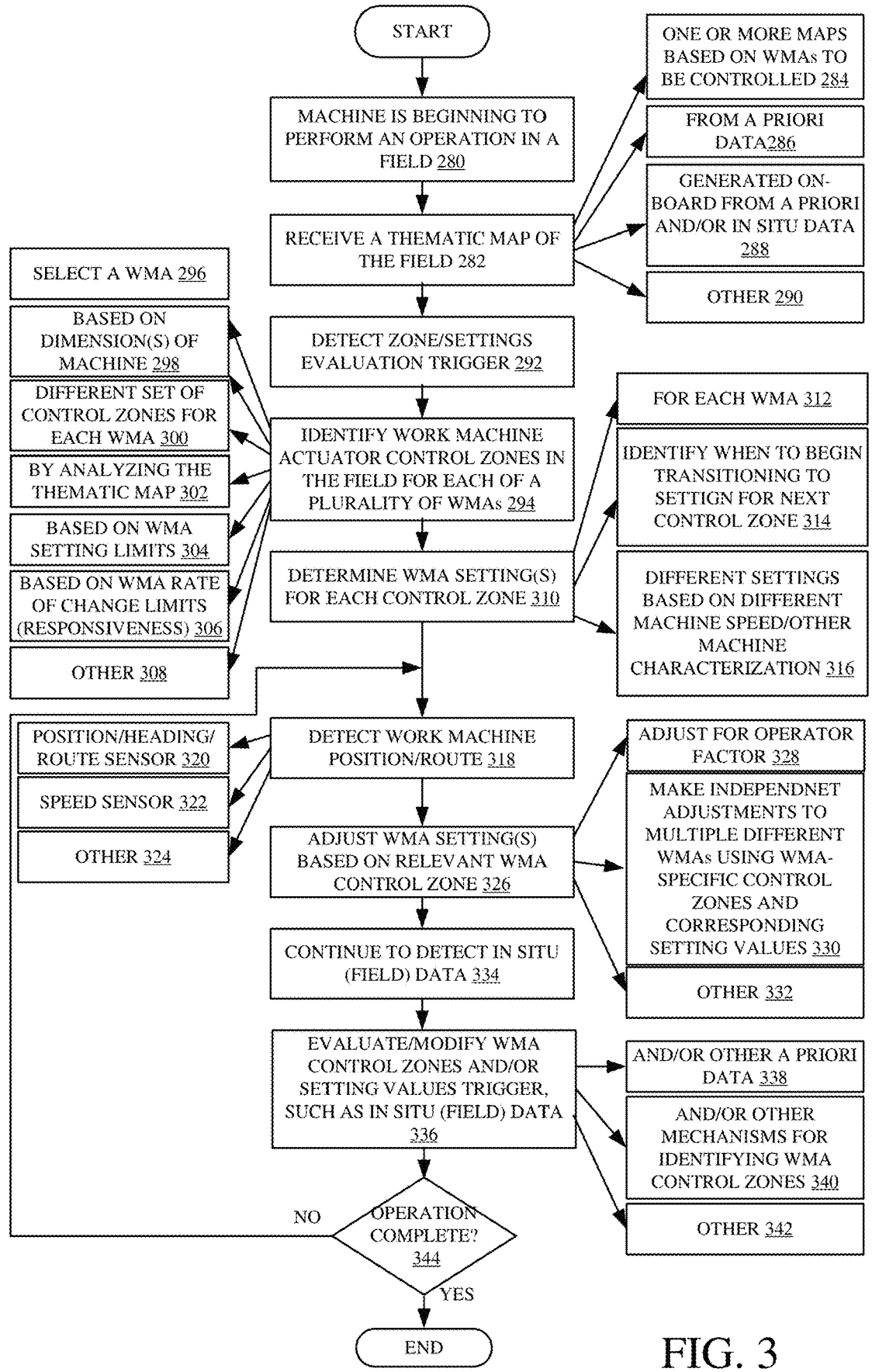
FIG. 3 is a flow diagram illustrating one example of the operation of the work machine shown in FIG. 2, in receiving a priori data, identifying machine control zones, and corresponding settings values, and controlling the work machine based upon the control zones and setting values, and based upon the position of the work machine.

FIG. 3 is a flow diagram illustrating one example of work machine 100 in doing this. The present description will proceed with respect to work machine 100 being a combine harvester. Of course, this is given by way of example only.

It is first assumed that machine 100 is beginning to perform an operation in a field. This is indicated by block 280 in the flow diagram of FIG. 3. At some point, work machine 100 receives a thematic map, or other geo-referenced a priori data. This is indicated by block 282. It can include one or more maps based on the particular work machine actuators 202 to be controlled. This is indicated by block 284. The maps can represent different values or attributes that are referenced to different geographic locations in the field. The particular attributes reflected may differ, based upon the particular work machine actuators 202 that are to be controlled based on that map.

The thematic map can be generated by a priori data, as indicated by block 286. It can also be generated or modified on-board work machine 100 from a priori data and/or in situ data generated from sensors 184. This is indicated by block 288. The thematic map can be received in a wide variety of other ways as well, and this is indicated by block 290.

While the operation is being performed, in situ data collection system 188 collects in situ data from sensors 184. At some point, WMA control zone and settings evaluation trigger logic 190 will detect a trigger indicating that control zones and settings may need to be generated or evaluated for modification. Detecting the trigger is indicated by block 292. Some examples of the trigger criteria were discussed above.

In response to that trigger, dynamic WNA control zone identification system 196 then identifies the control zones. WMA selector logic 236 first identifies control zones for each of the work machine actuators 202 to be controlled based upon control zones. This is indicated by block 294. WMA selector logic 236 can select each of the work machine actuators, in turn. This is indicated by block 296. Work machine actuator-specific zone identifier 238 then identifies the particular work machine actuator control zones based upon the information received from map processor system 186 and based on which work machine actuator is selected. It can do this based upon the dimensions of the machine 224. This is indicated by block 298 in the flow diagram of FIG. 3. It can generate a different set of control zones for each WMA. This is indicated by block 300. It can do this by analyzing the data in the thematic map as indicated by block 302 (and as is described in greater detail below). It can identify the control zone based upon the actuator data 226, such as the setting limit data (data that identifies a limit or range within which a setting can be made) and the rate of change data (or responsiveness data). This is indicated by blocks 304 and 306 in the flow diagram of FIG. 3. WMA-specific zone identifier 238 can identify the zones, for each work machine actuator, in a wide variety of other ways as well, and this is indicated by block 308.

Dynamic setting identifier system 198 then determines the work machine actuator settings for each control zone identified in step 294. This is indicated by block 310. Again, WMA selector 242 can select each of the work machine actuators that have control zones, for which setting values are to be identified. This is indicated by block 312. Control zone selector 244 can then select a control zone for which settings values are to be generated, and it can identify when to begin transitioning to that setting value for the next control zone, or that can be controlled dynamically by control system 200. Identifying when to begin transitioning (or actuating the work machine actuator) to the next setting value is indicated by block 314 in the flow diagram of FIG. 3.

Settings value identifier 246 can identify a single actuator setting for a corresponding control zone, or it can identify multiple different setting values that may be selected based upon different criteria. For instance, it may generate a first setting value if machine 100 is traveling at a first speed, and it may select a second setting value if machine 100 is traveling at a second speed. Identifying different setting values based upon different machine speeds or other machine characteristics or parameters is indicated by block 316. The setting values for each control zone can be identified in a wide variety of other ways as well.

Once the control zones and the corresponding setting values have been identified, they are provided to control system 200 so that it can control the work machine actuators 202 based upon the control zones and setting values. In doing so, position/route identifier logic 256 detects the current geographic position and route of work machine 100. This is indicated by block 318 in the flow diagram of FIG. 3. For instance, it can do this by detecting the position from position sensor 157 and the heading or orientation or pose of machine 100 from route sensor 210. This is indicated by block 320. It can also detect the speed of machine 100 from speed sensor 147. This is indicated by block 322. It can detect the work machine position and route in a wide variety of other ways as well, and this is indicated by block 324.

Zone accessing logic 257 then accesses the relevant control zones (those that machine 100 is in or is about to cross into), and WMA setting value adjustment identifier logic 258 identifies the magnitude and direction of adjustments (if any) for the different work machine actuators 202, based upon that information. Control signal generator logic 260 then generates the control signals, at the appropriate time, so that the new setting values will be reached when, or shortly after, work machine 100 crosses into a new control zone. This is indicated by block 326 in the flow diagram of FIG. 3.

It may also be that operator 208 has expressed particular preferences. For instance, the last time machine 100 entered into a similar control zone, the operator may have changed the setting value upward or downward for one or more actuators. In that case, control signal generator logic 260 senses and stores that adjustment so that the next time work machine 100 enters a similar control zone, that adjustment can be applied to the setting values that were identified by dynamic setting identifier system 198. Adjusting the setting value per operator factor, in this way, is indicated by block 328 in the flow diagram of FIG. 3.

Also, as discussed above, control system 200 can make adjustments to multiple different work machine actuators, using work machine actuator-specific control zones and settings values. This is indicated by block 330. Adjusting the WMA settings based upon the relevant WMA control zones can be done in other ways as well, and this is indicated by block 332.

While work machine 100 continues to perform the operation in the field, in situ data collection system 188 continues to collect in situ data from sensors 184. This is indicated by block 334 in the flow diagram of FIG. 3. Trigger logic 190 detects evaluation triggers to determine whether the control zones and/or the setting values, need to reevaluated or reset based on data that has been collected by system 188. When a trigger is detected, it provides an output indicative of this to dynamic WMA control zone identification system 196 and/or dynamic setting identifier system 198, so that they can reevaluate the control zones and/or settings, based upon the currently detected trigger criteria. Performing that evaluation based upon the in situ data aggregated by system 188 is indicated by block 336. For instance, changes in sensed machine speed may cause the system to modify the size and/or location of the control zones and/or setting values. Detected actuator responsiveness may differ from what was expected or detected earlier in the operation. The control zones and/or settings values can be modified based on that as well. Other in situ data can be used to dynamically modify the control zones and/or settings values. An evaluation can also be triggered by receiving additional or different a priori data 206. This is indicated by block 338. The reevaluation trigger can also be detected when any adjustments are made to the way in which system 196 identifies control zones, or the way in which system 198 identifies settings values. This is indicated by block 340. The evaluation or modification to the WMA control zones and setting values can be done in a wide variety of other ways as well, and this is indicated by block 342.

Until the operation is complete, processing reverts to block 318 where control system 200 continues to control work machine actuators 202 using the identified control zones and setting values, and where those control zones and setting values are dynamically reevaluated and adjusted, based upon in situ data or for other reasons. This is indicated by block 344 in the flow diagram of FIG. 3.

Figure 4:
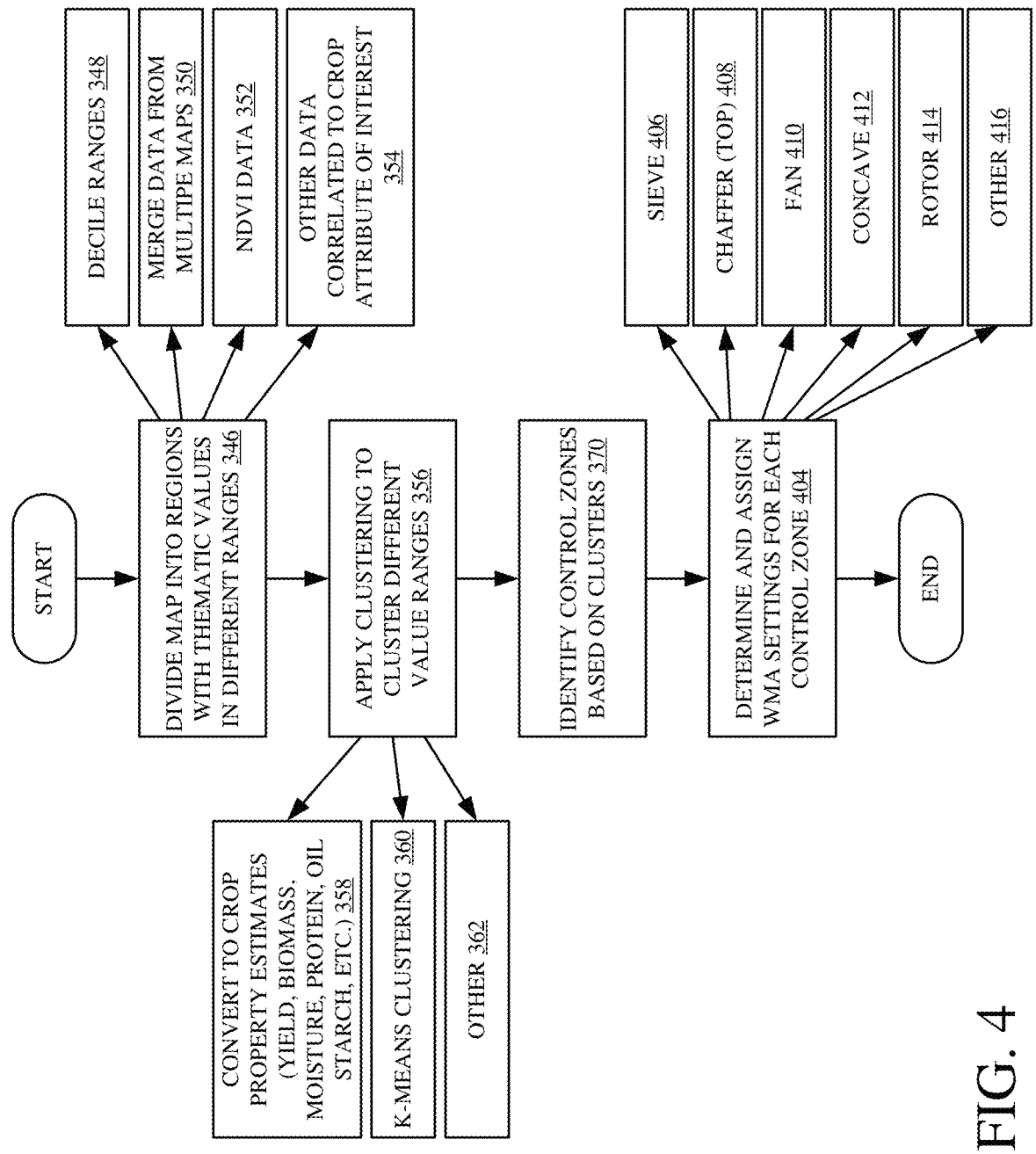
FIG. 4 is a flow diagram showing one example of the operation of the work machine in generating different sets of control zones, each having their own settings values, for different corresponding actuators on the work machine.

FIG. 4 is a flow diagram illustrating one example of the operation of dynamic WMA control zone identification system 196 and dynamic setting identifier system 198, in more detail. It is assumed that a geo-referenced a priori map of a variable or set of parameters, mapped to different geographic locations on a field, has been received. The map can map variables such as topography, soil type, vegetation index data, vegetation type (such as species, variety, etc.) and/or a wide variety of other variables to the geographic locations. WMA-specific zone identifier 238 then divides that map into regions of thematic values (the variables or parameters that are mapped), where each region represent a set of thematic values (the parameters or variables mapped) in different ranges. This is indicated by block 346 in the flow diagram of FIG. 4. In one example, the map is divided into regions of thematic values in decile ranges. This is indicated by block 346. In another example, the data can be divided into regions where the data represents sets of data that are merged from multiple different maps. This is indicated by block 350 in the flow diagram of FIG. 4.

One example of the data can be NDVI data, as indicated by block 352. The data can, of course, represent a wide variety of other data correlated to crop attributes of interest. This is indicated by block 354.

Zone identifier 238 then applies a clustering mechanism to cluster the different value ranges identified in block 346. Clustering is indicated by block 356 in the flow diagram of FIG. 4. By way of example, the clustering algorithm may convert the map of variables into crop property estimates, such as yield, biomass, moisture, protein, oil, starch, etc. This is indicated by block 358. The clustering mechanism can be any of a wide variety of different types of clustering mechanisms, such as a K-means clustering mechanism. This is indicated by block 360. The clustering can be done in a wide variety of other ways as well. This is indicated by block 362.

Figure 5:
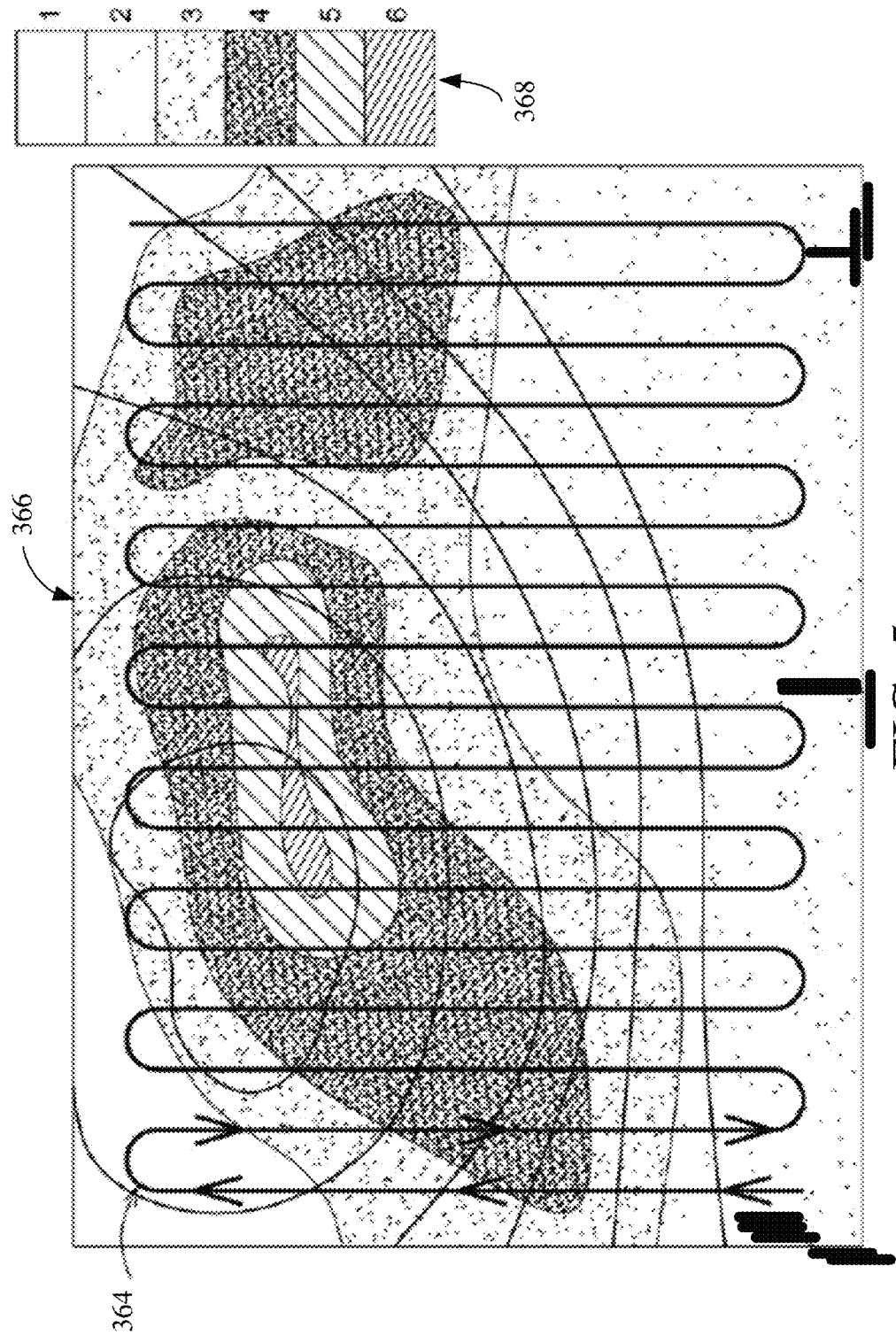
FIG. 5 illustrates one example of a clustered thematic field map with ranges of variable values clustered in different geographic regions.

An example may be helpful. FIG. 5 shows one example of an a priori map that maps NDVI data for a field. The map may be generated by assigning NDVI data to aerial imagery taken of the field. The map may be color-coded or otherwise coded to depict locations in the field with NDVI values in different ranges (such as different decile ranges). As described above with respect to block 354, crop data other than NDVI data may of course be used, so long as the data is well correlated to the crop attribute of interest.

FIG. 5 shows the map, after application of a clustering algorithm, such as K-means clustering, or any suitable geo-clustering algorithm has been used to generate the clusters. Such algorithms may have parameters that can be set, and that are related to the number of clusters, the size of the clusters, etc. As discussed above with respect to block 350, multiple maps may be used to incorporate data, other than NDVI or other crop image data. Examples of such maps can include, as mentioned above, topography, soil type, vegetation type, etc.

FIG. 5 also shows one projected or predicted route 364 of work machine 100 through field 366. FIG. 5 also includes legend 368 which illustrates that the variable values represented on the map of field 366 have been clustered into six different value ranges. The value ranges are illustrated by value ranges 1-6 in legend 368. The value ranges may be left as is, or converted to a priori crop property estimates such as those illustrated in block 358 in the flow diagram of FIG. 4. If left as is, the crop property values may be assigned after ground truthing with in situ data collected by in situ data collection system 188. If a priori estimates are made, they can be adjusted when triggered by trigger logic 190 to reevaluate the zones and settings values.

Figure 6:
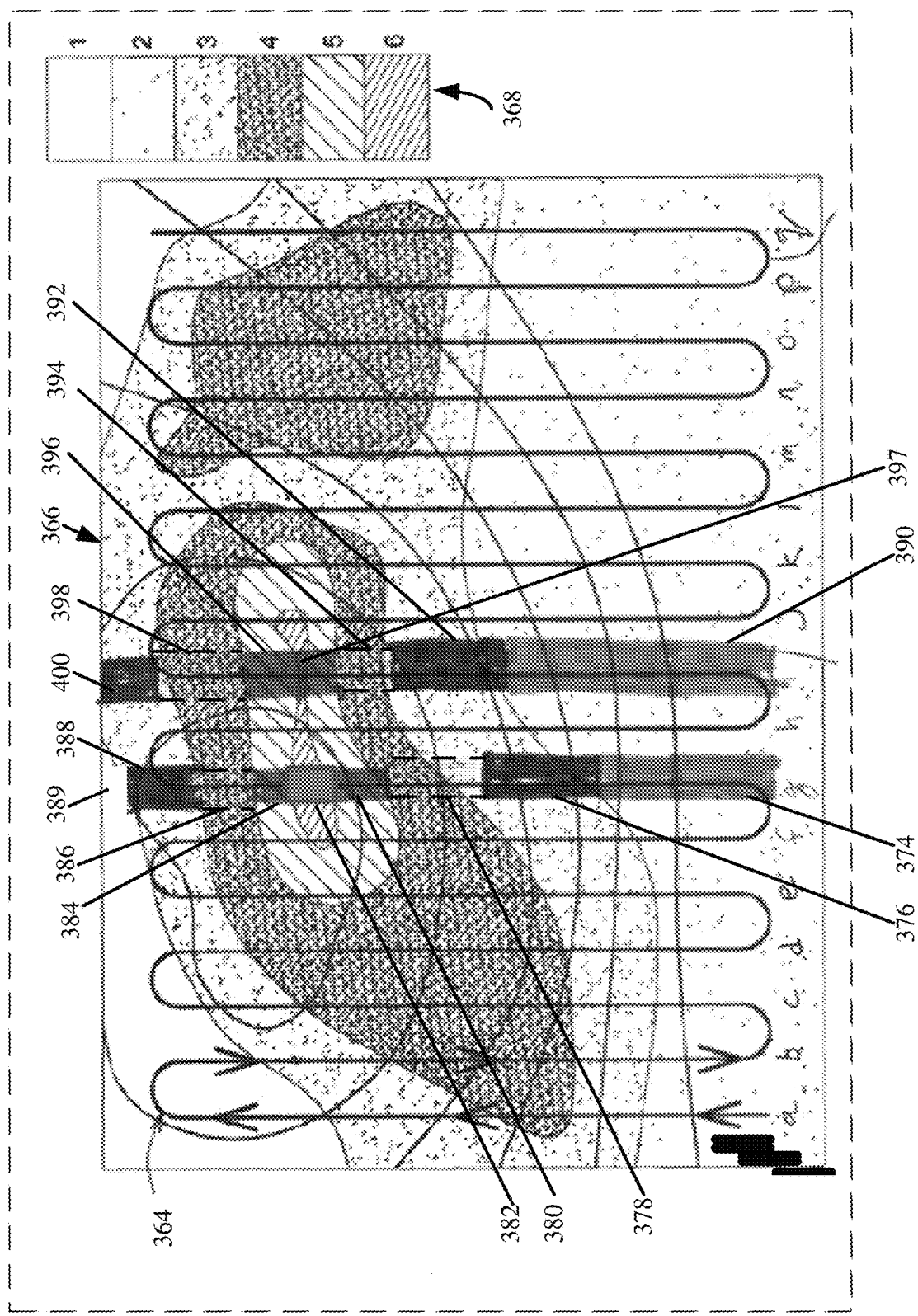
FIG. 6 shows one example of a field map, such as that illustrated in FIG. 5, with control zones identified thereon, based upon the clustered variables.

Once the clusters are generated, such as those shown in FIG. 5, then WMA-specific zone identifier 238 identifies control zones based on those clusters. This is indicated by block 370 in the flow diagram of FIG. 4. FIG. 6 shows one example of this.

In FIG. 6, each of the passes of machine 100 through field 366, along route 364, are labeled a-q. Assignment of example control zones are shown for machine passes g and i in FIG. 6. FIG. 6 shows that pass g has been divided into control zones 374, 376, 378, 380, 382, 384, 386, 388 and 389. Pass g shows an example in which there is sufficient time to respond to each of the different clusters along the pass, so that a different control zone can be identified based on the cluster changes along pass g illustrated in FIG. 6. By contrast, pass i shows that the portion 397 of the cluster in range 6 (defined in legend 368) is too small for the actuator (for which the control zones are being mapped) to respond. For instance, the time that work machine 100 is over the cluster portion 397 in range 6, in pass i, will be too short for the corresponding actuator to respond. Therefore, the settings for control zone 296 are retained, even as machine 100 passes over the cluster portion 397 range 6 in pass i.

As a more specific example, assume the maps shown in FIGS. 5 and 6 are for a wheat field with the six different clusters identified in legend 368 as representing predicted yield of 0-10, 11-20, 21-30, 31-40, 41-50, and 51-60 bushels per acre, respectively. In that case, for the control zones identified in FIG. 6, the sieve actuator 264 in work machine 100 can be actuated so that the bottom sieve values are assigned to sieve control zones as shown in Table 1 below.

TABLE 1

| Zones(s) | Bottom Sieve Setting |
| --- | --- |
| 389 | 5.5 |
| 374, 390 | 6.0 |
| 376, 388, 392, 400 | 6.5 |
| 378, 386, 394, 398 | 7.0 |
| 380, 384, 396 | 7.5 |
| 382 | 8.0 |

The control zones identified for chaffer 266 can have settings so that the chaffer actuator 266 is actuated to make the top chaffer settings, for the zones shown in FIG. 6, as set out below in Table 2:

TABLE 2

| Zones(s) | Top Chaffer Setting |
| --- | --- |
| 389 | 17.0 |
| 374, 390 | 17.0 |
| 376, 388, 392, 400 | 17.0 |
| 378, 386, 394, 398 | 18.0 |
| 380, 384, 396 | 19.0 |
| 382 | 20.0 |

It will be noted that, in one example, the settings for the bottom sieve, where the crop is wheat, may be varied linearly. Therefore, instead of a map containing control zones with machine settings, some example implementations may have yield zones with the yield being plugged into a mathematical formula, or a lookup table, to provide the setting for that zone. All of these, and other scenarios, are contemplated herein.

Also, the chaffer actuator 266 can be controlled to set the top chaffer using a different settings map (e.g., different setting zones) than the bottom sieve map. For instance, there may be no change in the top chaffer settings at the low end of harvested yield. Thus, a single control zone can be defined for yields in the 0-35 bushels per acre range. In addition, there may be a significant change in the recommended settings for the top chaffer when yield increases from 40-50+ bushels per acre. Thus, rather than being represented by three zones, in that upper range of yield values, there may be finer resolution zones that provide better control resolution. One example of such zones can be those defined in Table 3 below:

TABLE 3

| Zone(s) | Top Chaffer setting |
| --- | --- |
| 00-34 bu/ac | 17.0 |
| 35-39 bu/ac | 17.5 |
| 40-44 bu/ac | 18.0 |
| 45-49 bu/ac | 18.5 |

TABLE 3-continued

| Zone(s) | Top Chaffer setting |
| --- | --- |
| 50-54 bu/ac | 19.0 |
| 55+ bu/ac | 19.5 |

It will be noted that the above setting values are examples only. Determining the WMA setting for each control zone is indicated by block 404 in the flow diagram of FIG. 4. Determining the setting values for the sieve actuator is indicated by block 406. Determining the setting values for the top chaffer actuator is indicated by block 408. Determining setting values for the fan speed actuator is indicated by block 10. Determining setting values for the concave actuator is indicated by block 12. Determining setting values for the rotor actuator is indicated by block 414. It will also be noted that other setting values can be determined for other actuators, as indicated by block 416.

The present discussion should also not be limited to a single machine 100. Instead, multiple machines may communicate with one another (such as in performing a harvesting operation at a field). In that case, the processing described herein can be distributed among the machines. For instance, the control zones may be identified by a single machine and communicated to the other machines which identify their own setting values for those zones. In another example, the setting values can be sent to all machines, from a single machine, and each machine may identify its own control zones, based on machine specific data (such as dimensions, actuator responsiveness or limits, etc.). In yet another example, there may be multiple different kinds of harvesters performing the harvesting operation. In that case, one machine of each kind (model, make, etc.) may identify control zones and settings for all machines of its type and send them to all other machines of the same type. These are examples only.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 7:
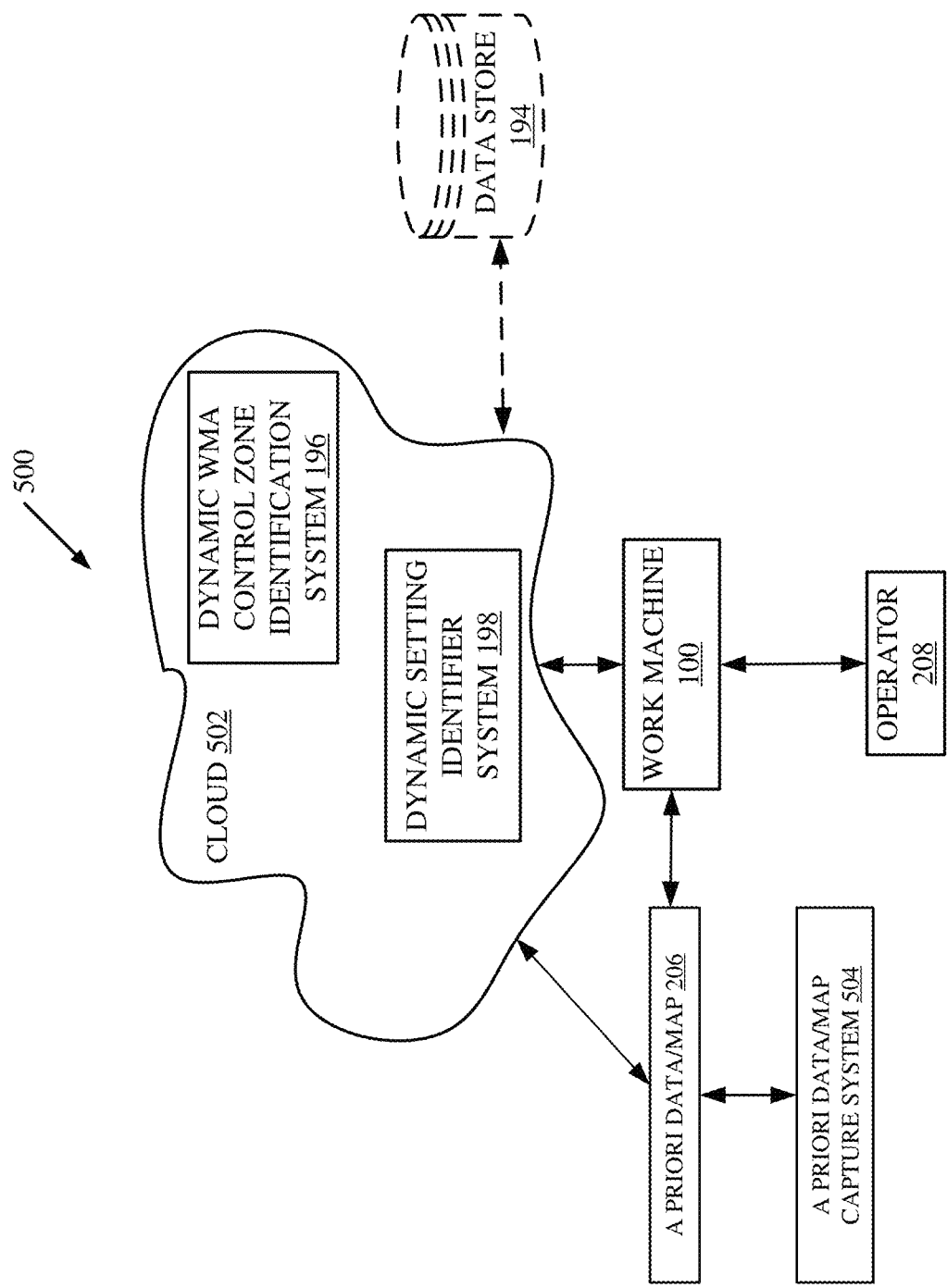
FIG. 7 shows items in previous Figures, that in a remote server environment.

FIG. 7 is a block diagram of harvester 100, shown in FIG. 2, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 2 and they are similarly numbered. FIG. 7 specifically shows an a priori data/map capture system 504 can capture a priori data/map 206. Systems 196 and/or 198 can be located at a remote server location 502. Therefore, harvester 100 accesses those systems through remote server location 502.

FIG. 7 also depicts another example of a remote server architecture. FIG. 7 shows that it is also contemplated that some elements of FIG. 2 are disposed at remote server location 502 while others are not. By way of example, data store 194 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location.

Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester comes close to the fuel truck for fueling, the system automatically collects the information from the harvester or transfers information to the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send and receive the information to/from the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
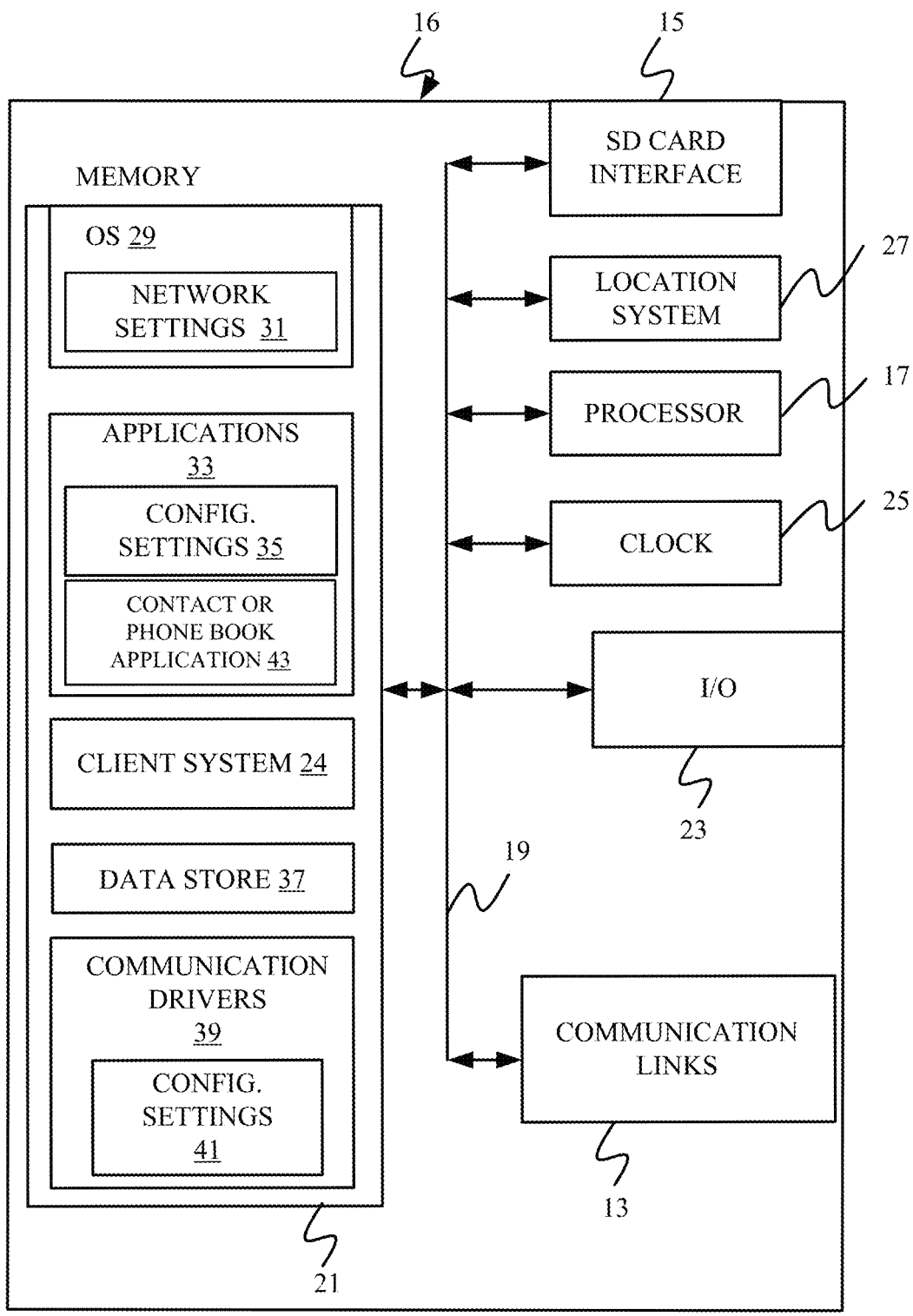
FIGS. 8-10 show examples of mobile devices that can be used in the architectures shown in previous FIGS.
Figure 9:
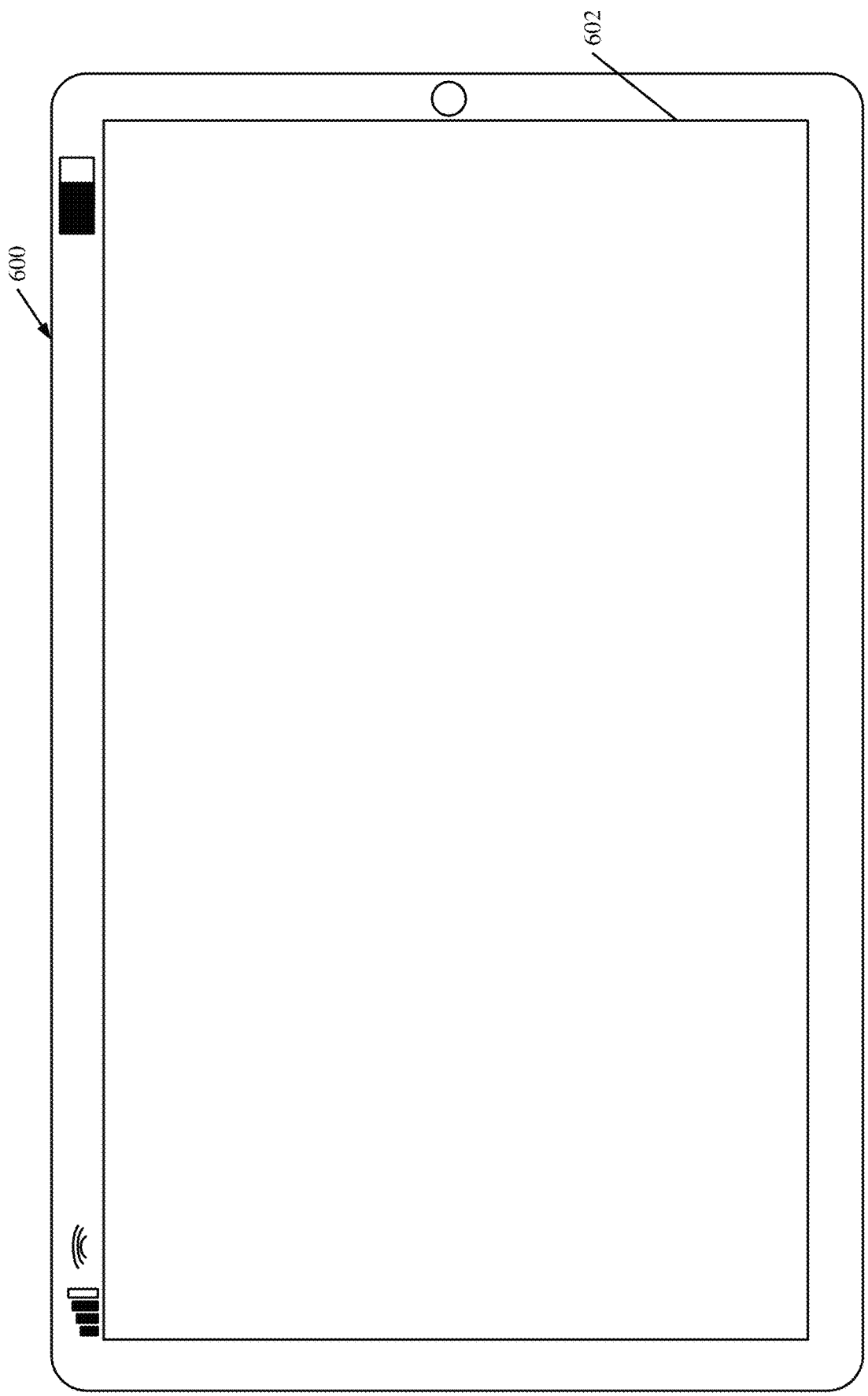
Figure 10:
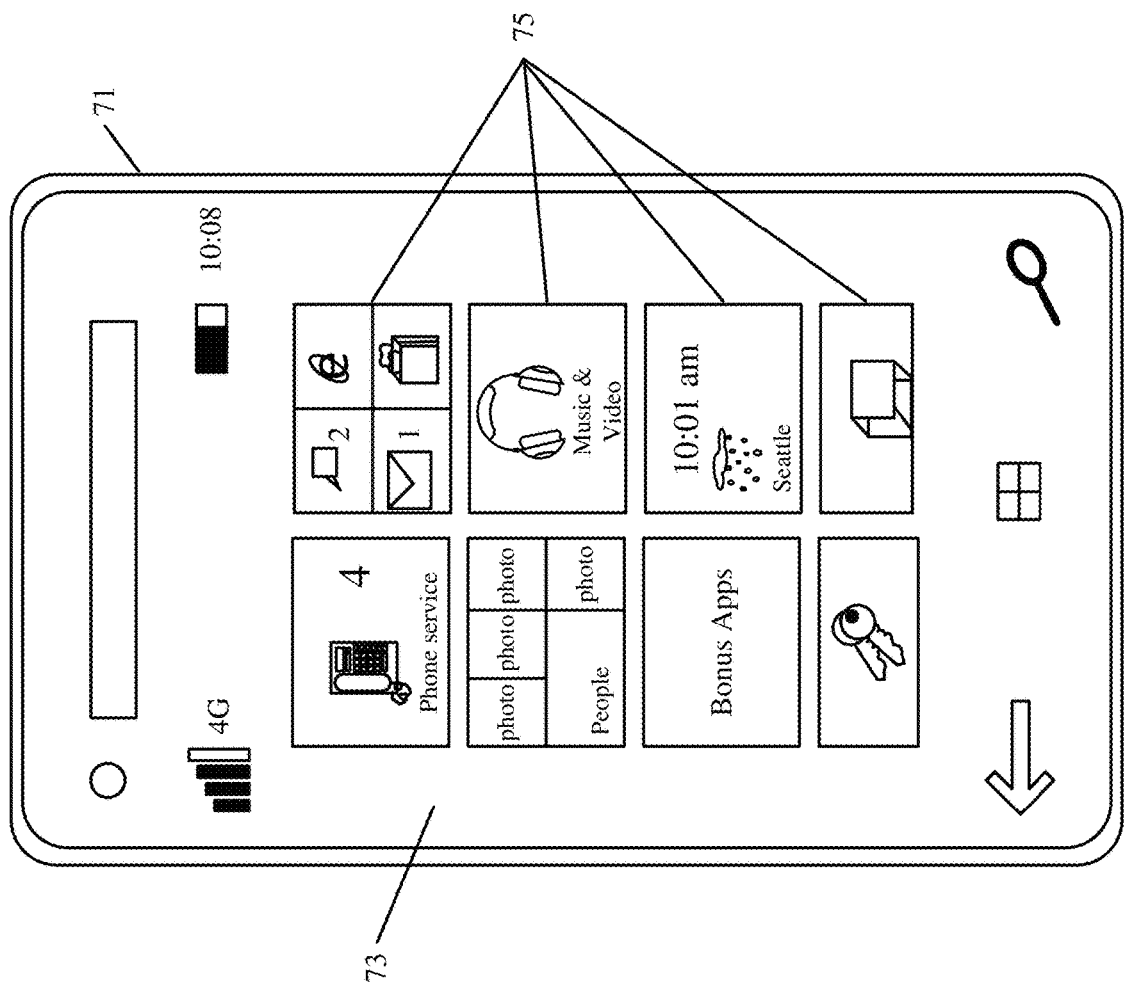

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the settings data or map data or zone data. FIGS. 9-10 are examples of handheld or mobile devices.

FIG. 8 provides a general block diagram of the components of a client device 16 that can run some components shown in FIG. 2, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system.

It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
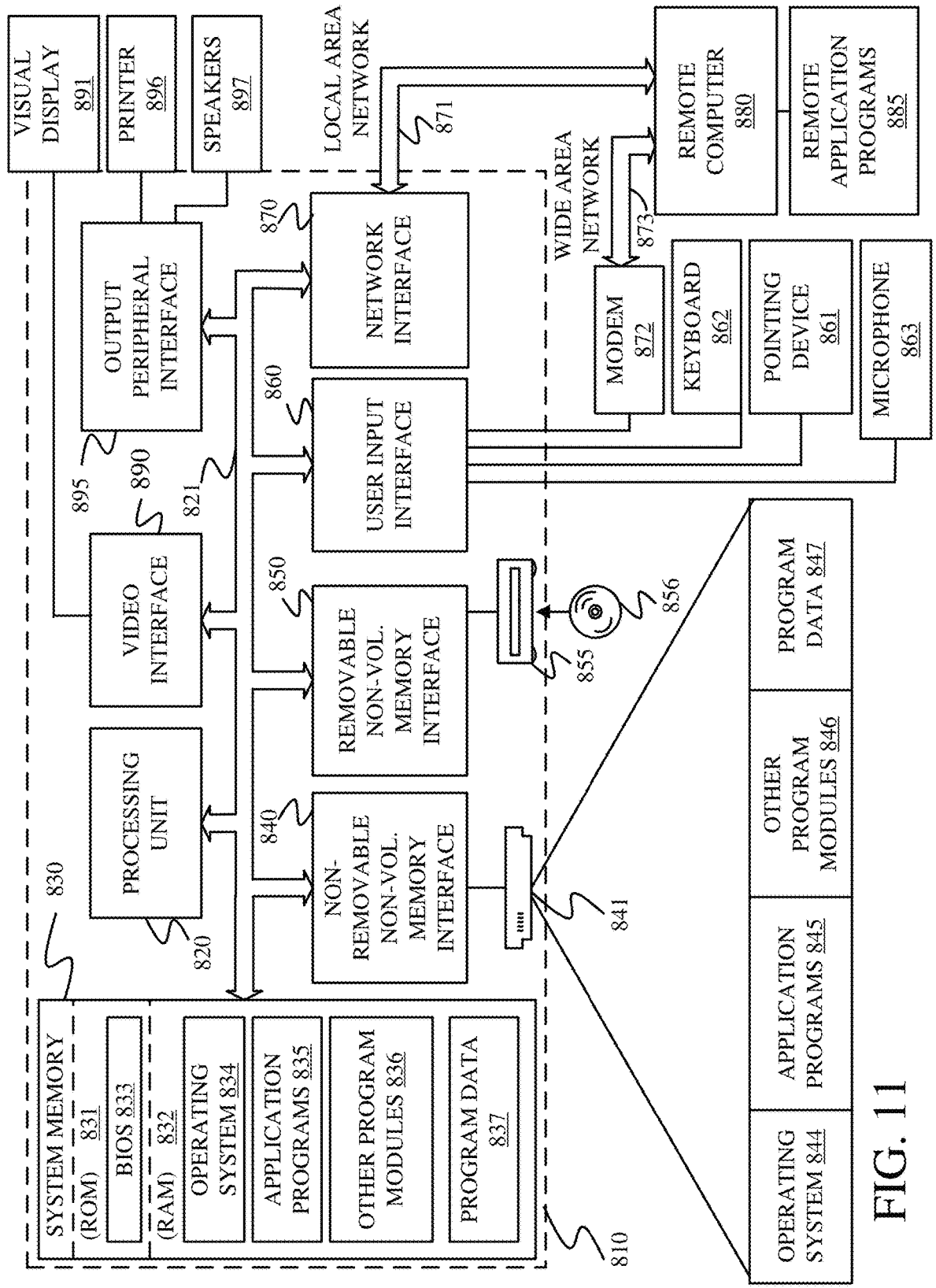
FIG. 11 is a block diagram showing one example of a computing environment that can be used in the architectures shown in previous examples.

FIG. 11 is one example of a computing environment in which elements of FIG. 2, or parts of it, (for example) can be deployed. With reference to FIG. 11, an example system for implementing some embodiments includes a computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network—WAN or a controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a work machine, comprising:
a plurality of work machine actuators (WMAs);
a dynamic control zone identification system that dynamically identifies a plurality of WMA control zones on a worksite based on a thematic map of the worksite that maps variable values to different geographic locations on the worksite;
a dynamic setting identifier system that assigns a WMA setting value to each of the WMA control zones;
a position sensor that senses a geographic position of the work machine on the worksite as the work machine is performing an operation and generates a position signal indicative of the geographic position of the work machine; and
a control system that generates control signals to control the WMAs based on the geographic position of the work machine relative to the WMA control zones and the setting values in the WMA control zones.

Example 2 is the work machine of any or all previous examples and further comprising:
an in situ data collection system configured to collect in situ data from a data sensor that senses the in situ data as the work machine performs the operation.

Example 3 is the work machine of any or all previous examples wherein the dynamic control zone identification system is configured to dynamically modify identification of the plurality of WMA control zones on the worksite based on the in situ data.

Example 4 is the work machine of any or all previous examples wherein the dynamic control zone identification system comprises:
a WMA-specific zone identifier configured to identify a different set of WMA control zones corresponding to each of the plurality of different WMAs.

Example 5 is the work machine of any or all previous examples wherein the dynamic setting identifier system is configured to generate actuator-specific setting values, specific to a selected WMA, for each WMA control zone in the set of WMA control zones corresponding to the selected WMA.

Example 6 is the work machine of any or all previous examples wherein the WMA-specific zone identifier is configured to identify the different set of WMA control zones corresponding to each of the plurality of different WMAs, based on responsiveness of each of the different WMAs.

Example 7 is the work machine of any or all previous examples wherein the WMA-specific zone identifier is configured to identify the different set of WMA control zones corresponding to each of the plurality of different WMAs, based on setting limits of each of the different WMAs.

Example 8 is the work machine of any or all previous examples wherein the WMA-specific zone identifier is configured to modify identification of the different set of WMA control zones corresponding to each of the plurality of different WMAs, based on the in situ data.

Example 9 is the work machine of any or all previous examples wherein the dynamic setting identifier system is configured to modify the actuator-specific setting values, specific to the selected WMA, for each WMA control zone in the set of WMA control zones corresponding to the selected WMA, based on the in situ data.

Example 10 is the work machine of any or all previous examples wherein the dynamic control zone identification system is configured to identify the plurality of WMA control zones based on dimensions of the work machine.

Example 11 is the work machine of any or all previous examples wherein the dynamic control zone identification system is configured to identify a point in each of the plurality of WMA control zones where the selected WMA is to be actuated based on a speed of the work machine, a responsiveness of the selected actuator and a magnitude of change in the actuator-specific setting value from a current WMA control zone to a next subsequent WMA control zone.

Example 12 is a method of controlling a work machine to perform an operation on a worksite, the method comprising:
a plurality of work machine actuators (WMAs);
dynamically identifying a plurality of work machine actuator (WMA) control zones on the worksite based on a thematic map of the worksite that maps variable values to different geographic locations on the worksite;
assigning a WMA setting value to each of the WMA control zones;
sensing a geographic position of the work machine on the worksite as the work machine is performing the operation and generating a position signal indicative of the geographic position of the work machine; and
generating control signals to control the WMAs based on the geographic position of the work machine relative to the WMA control zones and the setting values in the WMA control zones.

Example 13 is the method of any or all previous examples and further comprising:
collecting in situ data from a data sensor that senses the in situ data as the work machine performs the operation; and
modifying assignment of the WMA setting value to each of the WMA control zones, based on the in situ data, while the machine is performing the operation.

Example 14 is the method of any or all previous examples and further comprising:
modifying identification of the plurality of WMA control zones on the worksite based on the in situ data.

Example 15 is the method of any or all previous examples wherein dynamically identifying a plurality of work machine actuator (WMA) control zones comprises:
identifying a different set of WMA control zones corresponding to each of the plurality of different WMAs.

Example 16 is the method of any or all previous examples wherein assigning a WMA setting value to each of the WMA control zones comprises:
generating actuator-specific setting values, specific to a selected WMA, for each WMA control zone in the set of WMA control zones corresponding to the selected WMA.

Example 17 is the method of any or all previous examples wherein identifying a different set of WMA control zones corresponding to each of the plurality of different WMAs comprises:

identifying the different set of WMA control zones corresponding to each of the plurality of different WMAs, based on responsiveness of each of the different WMAs.

Example 18 is the method of any or all previous examples wherein identifying a different set of WMA control zones corresponding to each of the plurality of different WMAs comprises:

identifying the different set of WMA control zones corresponding to each of the plurality of different WMAs, based on setting limits of each of the different WMAs.

Example 19 is the method of any or all previous examples and further comprising:

identifying a point in each of the plurality of WMA control zones where the selected WMA is to be actuated based on a speed of the work machine, a responsiveness of the selected actuator and a magnitude of change in the actuator-specific setting value from a current WMA control zone to a next subsequent WMA control zone.

Example 20 is a work machine, comprising:

a plurality of work machine actuators (WMAs);

an in situ data collection system configured to collect in situ data from a data sensor that senses the in situ data as the work machine performs an operation at the worksite;

a dynamic control zone identification system that dynamically identifies a plurality of WMA control zones on a worksite, based on a thematic map of the worksite that maps variable values to different geographic locations on the worksite, and that modifies identification of the plurality of WMA control zones on the worksite based on the in situ data;

a dynamic setting identifier system that assigns a WMA setting value to each of the WMA control zones and that modifies assignment of the WMA setting value to each of the WMA control zones, based on the in situ data;

a position sensor that senses a geographic position of the work machine on the worksite as the work machine is performing an operation and generates a position signal indicative of the geographic position of the work machine; and a control system that generates control signals to control the WMAs based on the geographic position of the work machine relative to the WMA control zones and the setting values in the WMA control zones.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A work machine comprising:
a plurality of work machine actuators (WMAs);
a dynamic control zone identification system that dynamically identifies a plurality of WMA control zones on a worksite in which the work machine is to operate based on clustering variable values of a thematic map of the worksite, that maps the variable values to different geographic locations on the worksite, into separate value ranges;
a dynamic setting identifier system that assigns a WMA setting value to each of the WMA control zones;
a position sensor that senses a geographic position of the work machine on the worksite as the work machine is performing an operation and generates a position signal indicative of the geographic position of the work machine; and a control system that generates control singals to control the WMAs based on the geographic position of the work machine relative to the WMA control zones and the setting values in the WMA control zones to control operation of the work machine while the work machine operates in the WMA control zones.

2. The work machine of claim 1 and further comprising:
an in situ data collection system configured to collect in situ data from a data sensor that senses the in situ data as the work machine performs the operation.

3. The work machine of claim 2 wherein the dynamic control zone identification system is configured to dynamically modify identification of the plurality of WMA control zones on the worksite based on the in situ data.

4. The work machine of claim 2 wherein the dynamic control zone identification system comprises:
a WMA-specific zone identifier configured to identity a different set of WMA control zones corresponding to each of the plurality of different WMAs.

5. The work machine of claim 4 wherein the dynamic setting identifier system is configured to generate actuator-specific setting values, specific to a selected WMA, for each WMA control zone in the set of WMA control zones corresponding to the selected WMA.

6. The work machine of claim 5 wherein the WMA-specific zone identifier is configured to identify the different set of WMA control zones corresponding to each of the plurality of different WMAs, based on responsiveness of each of the different WMAs.

7. The work machine of claim 5 wherein the WMA-specific zone identifier is configured to identify the different set of WMA control zones corresponding to each of the plurality of different WMAs, based on setting limits of each of the different WMAs.

8. The work machine of claim 5 wherein the WMA-specific zone identifier is configured to modify identification of the different set of WMA control zones corresponding to each of the plurality of different WMAs, based on the in situ data.

9. The work machine of claim 6 wherein the dynamic setting identifier system is configured to modify the actuator-specific setting values, specific to the selected WMA, for each WMA control zone in the set of WMA control zones corresponding to the selected WMA, based on the in situ data.

10. The work machine of claim 6 wherein the dynamic control zone identification system is configured to identify the plurality of WMA control zones based on dimensions of the work machine.

11. The work machine of claim 6 wherein the dynamic control zone identification system is configured to identify a point in each of the plurality of WMA control zones where the selected WMA is to be actuated based on a speed of the work machine, a responsiveness of the selected actuator and a magnitude of change in the actuator-specific setting value from a current WMA control zone to a next subsequent WMA control zone.

12. A method of controlling a work machine to perform an operation on a worksite, the method comprising:
a plurality of work machine actuators (WMAs);
dynantically identifying a plurality of work machine actuator (WMA) control zones on the worksite in Which the work machine is to operate based on clustering variable values of a thematic map of the worksite, that maps the variable values to different geographic locations on the worksite, into separate value ranges;

assigning a WMA setting value to each of the WMA control zones;

sensing a geographic position of the machine on the worksite as the work machine is performing the operation and generating a position signal indicative of the geographic position of the work machine; and generating control signals to control the WMAs based on the geographic position of the work machine relative to the WMA control zones and the setting values in the WMA control zones to control operation of the work machine while the work machine operates in the WMA control zones.

13. The method of claim 12 and further comprising:

collecting in situ data from a data sensor that senses the in situ data as the work machine performs the operation; and modifying assignment of the WMA setting value to each of the WMA control zones, based on the in situ data, while the machine is performing the operation.

14. The method of claim 13 and further comprising:

modifying identification of the plurality of WMA control zones on the worksite based on the in situ data.

15. The method of claim 11 wherein dynamically identifying a plurality of work machine actuator (WMA) control zones comprises:

identifying a different set of WMA control zones corresponding to each of the plurality of different WMAs.

16. The method of claim 15 wherein assigning a WMA setting value to each of the WMA control zones comprises:

generating actuator-specific setting values, specific to a selected WMA, for each WMA control zone in the sot of WMA control zones corresponding to the selected WMA.

17. The method of claim 15 wherein identifying a different set of WMA control zones corresponding to each of the plurality of different WMAs comprises:

identifying the different set of WMA control zones corresponding to each of the plurality of different WMAs, based on responsiveness of each of the different WMAs.

18. The method of claim 15 wherein identifying a different set of WMA control zones corresponding to each of the plurality of different WMAs comprises:

identifying the different set of WMA control zones corresponding to each of the plurality of different WMAs, based on setting limits of each of the different WMAs.

19. The method of claim 15 and further comprising:

identifying a point in each of the plurality of WMA control zones where the selected WMA is to be actuated based on a speed of the work machine, a responsiveness of the selected actuator and a magnitude of change in the actuator-specific setting value from a current WMA control zone to a next subsequent WMA control zone.

20. A work machine comprising:

a plurality of work machine actuators (WMAs);

an in situ data collection system configured to collect in situ data front a data sensor that senses the in situ data as the work machine performs an operation at the worksite;

a dynamic control zone identification system that:
  obtains a thematic map of a worksite that maps variable values to different geographic locations on the worksite;
  dynamically identifies a plurality of WMA control zones on the worksite by clustering the variable values into separate value ranges; and
  modifies identification of the plurality of WMA control zones on the worksite based on the in situ data; and a dynamic setting identifier system that assigns a WMA setting value to each at the WMA control zones and that modifies assignment of the WMA setting value to each of the WMA control zones, based on the in situ data;

a position sensor that senses a geographic position of the work machine on the worksite as the work machine is performing an operation and generates a position signal indicative at the geographic position of the work machine; and a control system that generates control signals to control the WMAs based on the geographic position of the work machine relative to the WMA control zones and the setting values in the WMA control zones.

* * * * *